United States Patent
Ernström et al.

(10) Patent No.: US 12,108,356 B2
(45) Date of Patent: Oct. 1, 2024

(54) WIRELESS DEVICE, NETWORK NODE AND METHODS PERFORMED THEREIN FOR TIME OF ARRIVAL ESTIMATION

(71) Applicant: Telefonaktiebolaget LM Ericsson (publ), Stockholm (SE)

(72) Inventors: Per Ernström, Stockholm (SE); Erik Stare, Sollentuna (SE); Fredrik Gunnarsson, Linköping (SE); Florent Munier, Västra Frölunda (SE); Johannes Nygren, Uppsala (SE); Satyam Dwivedi, Solna (SE); Iana Siomina, Täby (SE); Deep Shrestha, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 596 days.

(21) Appl. No.: 17/421,452

(22) PCT Filed: Jan. 12, 2020

(86) PCT No.: PCT/SE2020/050018
§ 371 (c)(1),
(2) Date: Jul. 8, 2021

(87) PCT Pub. No.: WO2020/145877
PCT Pub. Date: Jul. 16, 2020

(65) Prior Publication Data
US 2022/0086787 A1 Mar. 17, 2022

Related U.S. Application Data

(60) Provisional application No. 62/791,630, filed on Jan. 11, 2019.

(51) Int. Cl.
*H04L 25/02* (2006.01)
*H04L 5/00* (2006.01)
(Continued)

(52) U.S. Cl.
CPC ....... *H04W 56/0055* (2013.01); *H04L 5/0048* (2013.01); *H04L 25/0212* (2013.01); *H04L 25/0224* (2013.01); *H04W 64/006* (2013.01)

(58) Field of Classification Search
None
See application file for complete search history.

(56) References Cited

U.S. PATENT DOCUMENTS

| | | |
|---|---|---|
| 2018/0227877 A1 | 8/2018 | Gunnarsson et al. |
| 2019/0109750 A1* | 4/2019 | Nam ............. H04L 5/0048 |
| 2019/0230475 A1* | 7/2019 | Edge ............. G01S 5/0236 |

FOREIGN PATENT DOCUMENTS

EP  2876951 A1  5/2015

OTHER PUBLICATIONS

International Search Report and Written Opinion dated Apr. 17, 2020 for International Application No. PCT/SE2020/050018 filed Jan. 12, 2020, consisting of 9-pages.
(Continued)

*Primary Examiner* — Minh Trang T Nguyen
(74) *Attorney, Agent, or Firm* — Weisberg I.P. Law, P.A.

(57) ABSTRACT

A method, system and apparatus are disclosed. In one or more embodiments, a method in a wireless device is provided. The wireless device is configured to communicate with a network node. The wireless device receives an extended signal transmitted by the network node. The extended signal includes a base signal and at least one additional signal. The wireless device estimates a time of arrival, TOA, based on the extended signal.

17 Claims, 17 Drawing Sheets

(51) Int. Cl.
*H04W 56/00* (2009.01)
*H04W 64/00* (2009.01)

(56) References Cited

OTHER PUBLICATIONS

3GPP TSG-RAN WG1 #95 R1-1813592; Title: RAT dependent NR positioning solutions; Agenda Item: 7.2.10.3; Source: Ericsson; Document for: Discussion, Decision; Date and Location: Nov. 12-16, 2018, Spokane, United States, consisting of 17-pages.

* cited by examiner

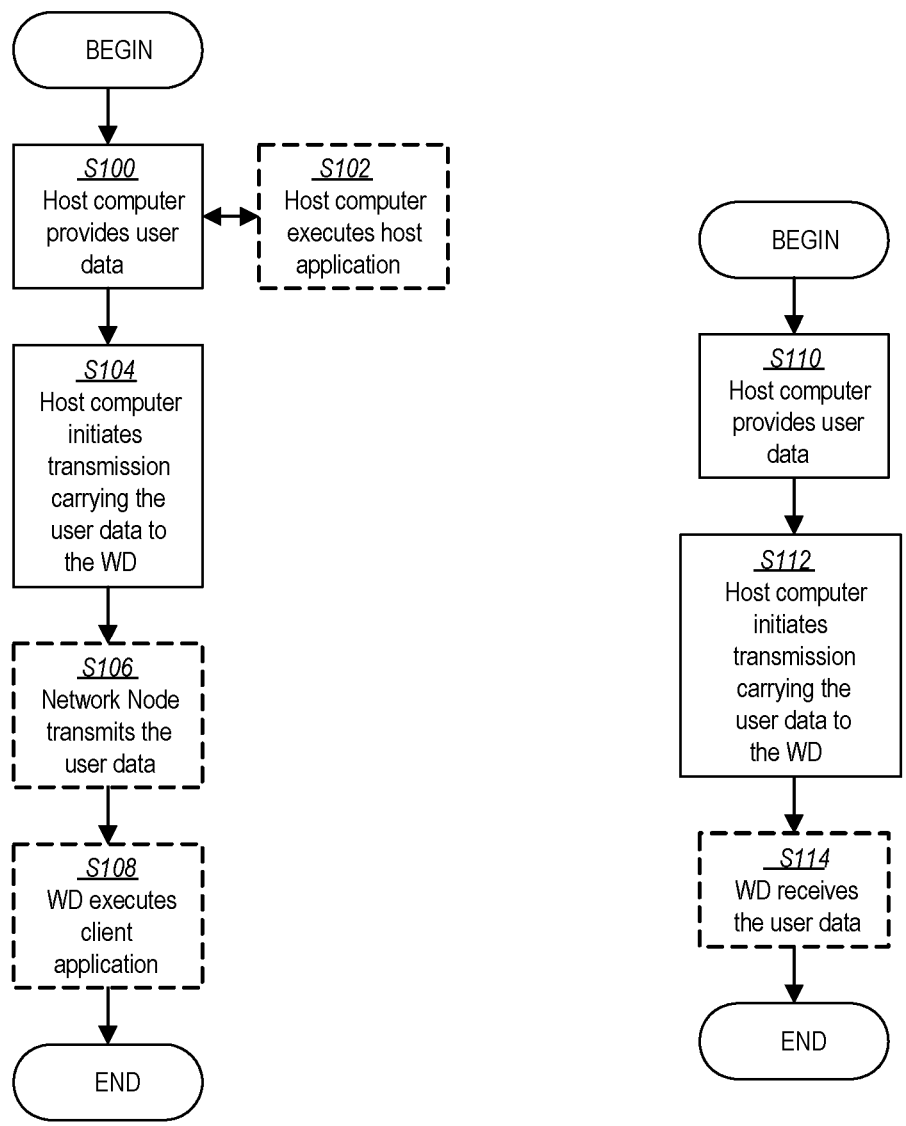

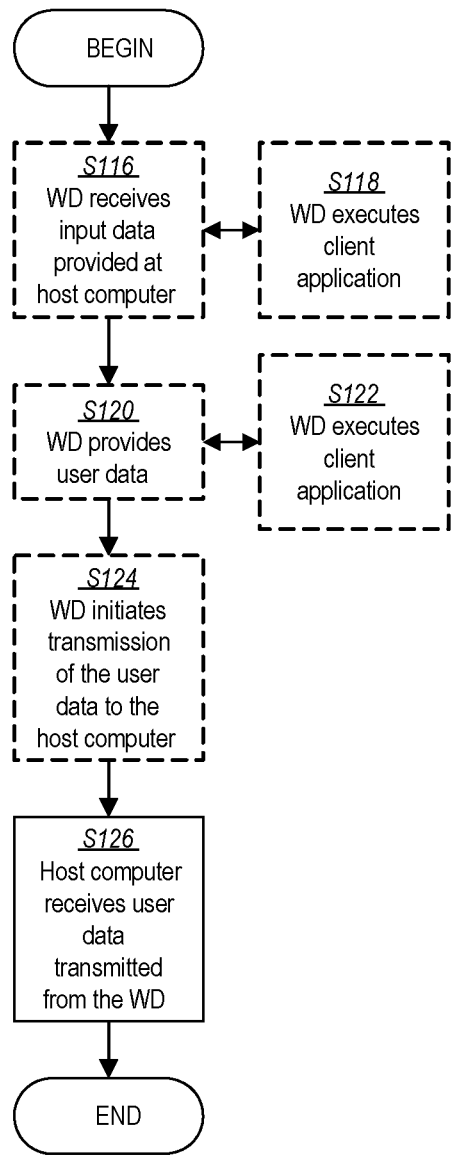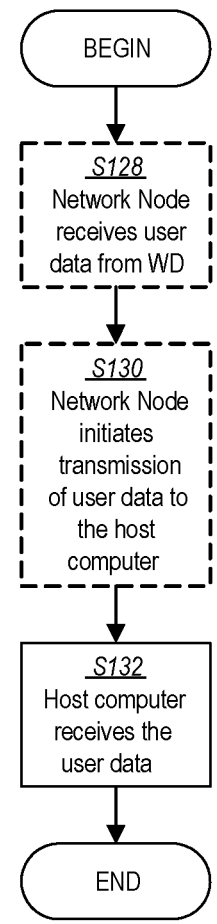
FIG. 12
FIG. 13

WIRELESS DEVICE, NETWORK NODE AND METHODS PERFORMED THEREIN FOR TIME OF ARRIVAL ESTIMATION

CROSS-REFERENCE TO RELATED APPLICATIONS

This application is a Submission Under 35 U.S.C. § 371 for U.S. National Stage Patent Application of International Application No.: PCT/SE2020/050018, filed Jan. 12, 2020 entitled "WIRELESS DEVICE, NETWORK NODE AND METHODS PERFORMED THEREIN FOR TIME OF ARRIVAL ESTIMATION," which claims priority to U.S. Provisional Application No. 62/791,630, filed Jan. 11, 2019, entitled "TRS EXTENSION FOR POSITIONING WITH IMPROVED TOA RANGE," the entireties of both of which are incorporated herein by reference.

FIELD

The present disclosure relates to wireless communications, and in particular, to a wireless device and a network node using an extended signal such as an extended tracking reference signal (TRS) for time of arrival (TOA) estimation.

BACKGROUND

Positioning has been a topic in Long Term Evolution (LTE) standardization since the Third Generation Partnership Project (3GPP) Release 9. The objective is to fulfill regulatory requirements for emergency call positioning. Positioning in New Radio (NR) is proposed to be supported by the architecture shown in FIG. 1. In FIG. 1, the base station (gNB) 1 (also referred to as network node) and a next generation (ng)-eNB 2 may not always both be present. The Location Management Function (LMF) 3 is the location server in NR. There are also interactions between the location server and the network node 1, e.g., gNodeB, via the NR Position Protocol A (NRPPa) protocol. The interactions between the network node and the wireless device are supported via the Radio Resource Control (RRC) protocol. FIG. 1 also shows a wireless device (WD) 4, an access and mobility management function (AMF) 5 and an evolved serving mobile location center node (E-SMLC) 6.

In the legacy LTE standards, the following techniques are supported:
  Enhanced Cell Identifier (ID). Cell ID information to associate the wireless device to the serving area of a serving cell, and then additional information to determine a finer granularity position;
  Assisted Global Navigation Satellite System (GNSS). GNSS information retrieved by the wireless device, supported by assistance information provided to the wireless device from E-Serving Mobile Location Center (SMLC);
  OTDOA (Observed Time Difference of Arrival). The wireless device estimates the time difference of reference signals from different base stations and sends to the E-SMLC for multilateration; and/or
  UTDOA (Uplink TDOA). The wireless device is requested to transmit a specific waveform that is detected by multiple location measurement units (e.g., network node) at known positions. These measurements are forwarded to E-SMLC for multilateration According to the NR positioning study item 3GPP Release (Rel.) 16, the 3GPP NR technology is being developed to provide added value in terms of enhanced location capabilities. The operation in low and high frequency bands (i.e., below and above 6 GHz) and utilization of massive antenna arrays provide additional degrees of freedom to substantially improve positioning accuracy. The possibility to use wide signal bandwidth in low and especially in high bands brings new performance bounds for wireless device location for well-known wireless device localization techniques and/or positioning techniques based on OTDOA and UTDOA, Cell-ID or E-Cell-ID etc., utilizing timing measurements to locate the wireless device. The recent advances in massive antenna systems (massive multiple-input multiple-output (MIMO)) can provide additional degrees of freedom to enable more accurate wireless device location by exploiting spatial and angular domains of propagation channel in combination with time measurements.

In 3GPP Release 9, Positioning Reference Signals (PRS) were introduced for antenna port 6 as 3GPP Release 8 cell-specific reference signals (CRS) may not be sufficient for positioning. One reason for this is that the required high probability of detection could not be guaranteed with CRS. A neighbor cell with its synchronization signals (Primary-/Secondary Synchronization Signals) and reference signals is seen as detectable when the Signal-to-Interference-and-Noise Ratio (SINR) is at least −6 dB. Simulations during standardization have shown that this can be guaranteed for only 70% of all cases for the 3rd best-detected cell which is the 2nd best neighboring cell. This may not be good enough and assumes an interference-free environment, which cannot be ensured in a real-world scenario. However, PRS may still have some similarities with cell-specific reference signals as defined in 3GPP Release 8. It is a pseudo-random Quadrature Phase Shift Keying (QPSK) sequence that is being mapped in diagonal patterns with shifts in frequency and time to avoid collision with cell-specific reference signals and an overlap with the control channels such as the physical downlink control channel (PDCCH).

The LTE standard based PRS provides three layers of isolation to improve hearability (i.e., the ability to detect weak neighbor cells):
  1. Code domain: Each cell transmits a different PRS sequence (that is orthogonal to other PRS sequences in the code domain);
  2. Frequency domain: the PRS has a frequency re-use of six, i.e., six possible frequency arrangements (called frequency offsets) that are defined within the PRS bandwidth. If two cells have the same frequency offset, the PRSs collide in the frequency domain. In such cases, the isolation from the orthogonal PRS sequences distinguishes one cell from the other; and
  3. Time domain: If PRSs collide in the frequency domain, muting (time-based blanking) can make the PRS occasions again appear orthogonal to each other.

In NR, the Channel State Information (CSI) Reference Signal (RS) for tracking (also referred to as the tracking reference signal (TRS)) comes in periodic bursts consisting of one or two slots, as illustrated in FIG. 2. Both burst periodicity and slot offset is configurable through the radio resource control (RRC) parameter CSI-ResourcePeriodicityAndOffset.

In the time domain, two symbols that are four symbols apart are used in each slot of the TRS burst. At low frequencies, three different symbol pair positions are allowed, giving three orthogonal patterns in time. At high frequencies, all symbol pair positions are allowed. This allows for a maximum of six different symbol pair positions. In practice, this is often limited further to a maximum of five symbol pair positions in order to avoid overlap with ControlResourceSets (CORESETs).

In the frequency domain, the TRS has a comb 4 structure. That means that frequency shifts give four orthogonal patterns in the frequency domain. In total, that gives 4*3=12 orthogonal patterns, as illustrated in FIG. 3. At high frequencies, all time shifts are allowed, which in principle should allow six in a slot, but since the first slot is used for control, e.g., control information, the allowed time shifts are typically only five TRSs (which depends on bandwidths and core set positions).

However, existing systems for positioning suffer from one or more limitations in TOA estimation and/or inter-site distance associated with the positioning.

SUMMARY

Some embodiments advantageously provide methods, systems, network nodes and wireless devices for using an extended signal such as an extended tracking reference signal (TRS) for time of arrival (TOA) estimation. In some embodiments, the extended tracking reference signal (TRS) includes an extended channel state information reference signal (CSI-RS).

According to one aspect, a network node is configured to communicate with a wireless device (WD). The network node includes processing circuitry configured to configure an extended signal that includes a base signal and at least one additional signal, the extended signal being used for estimation of time of arrival (TOA) at the wireless device. The network node also includes a radio interface configured to transmit the extended signal to the WD.

According to this aspect, in some embodiments, the configuration of the at least one additional signal depends on the configuration of the base signal. In some embodiments, the network node being configured to communicate with a wireless device further comprises at least one of: network node transmitting the extended signal via a radio interface and network node signaling the configuration of the extended signal to one of the wireless device and another network node. In some embodiments, the base signal is a tracking reference signal (TRS). In some embodiments, the at least one additional signal is configured in the same at least one slot as the base signal with at least one different symbol position. In some embodiments, the at least one additional signal has a subcarrier offset relative to the base signal of at least one subcarrier. In some embodiments, the extended signal utilizes all available subcarriers. In some embodiments, the base signal is a channel state information reference signal (CSI-RS). In some embodiments, the network node is configured to assign the at least one additional signal to a resource element that is shifted in frequency from a resource element to which the base signal is assigned. In some embodiments, the network node is configured to assign the at least one additional signal to a resource element that is shifted in time from a resource element to which the base signal is assigned. In some embodiments, the network node is configured to transmit a known combined signal to the WD for comparison to the extended signal.

According to another aspect, a method implemented in a network node configured to communicate with a wireless device is provided. The method includes configuring an extended signal that includes a base signal and at least one additional signal, the extended signal being used for estimation of time of arrival (TOA) at the wireless device. The method also includes transmitting the extended signal to the WD.

According to this aspect, in some embodiments, the configuration of the at least one additional signal depends on the configuration of the base signal. In some embodiments, the network node being configured to communicate with a wireless device further comprises at least one of: the network node transmitting the extended signal via a radio interface and the network node signaling the configuration of the extended signal to one of the wireless device and another network node. In some embodiments, the base signal is a tracking reference signal (TRS). In some embodiments, the at least one additional signal is configured in the same at least one slot as the base signal with at least one different symbol position. In some embodiments, the at least one additional signal has a subcarrier offset relative to the base signal of at least one subcarrier. In some embodiments, the extended signal utilizes all available subcarriers. In some embodiments, the base signal is a channel state information reference signal (CSI-RS). In some embodiments, the at least one additional signal is assigned to a resource element that is shifted in frequency from a resource element to which the base signal is assigned. In some embodiments, the at least one additional signal is assigned to a resource element that is shifted in time from a resource element to which the base signal is assigned. In some embodiments, the method includes transmitting a known combined signal to the WD for comparison to the extended signal.

According to another aspect, a WD is configured to communicate with a network node. The WD includes a radio interface, configured to receive an extended signal that includes a base signal and at least one additional signal, and processing circuitry configured to estimate a time of arrival (TOA) based on the extended signal.

According to this aspect, in some embodiments, a configuration of the at least one additional signal depends on a configuration of the base signal. In some embodiments, receiving the extended signal via the radio interface includes receiving the extended signal from a positioning node. In some embodiments, the base signal is a tracking reference signal (TRS). In some embodiments, the at least one additional signal is configured in the same at least one slot as the base signal with at least one different symbol position. In some embodiments, the estimating of the TOA includes adding, in the time domain, symbols of the base signal and symbols of the at least one additional signal. In some embodiments, the processing circuitry being configured to estimate the TOA further includes at least one of: the processing circuitry (84) being configured to correlate a received extended signal with a known combined signal and identify the delay of the earliest non-aliased peak in the correlation to determine the estimated TOA; and the processing circuitry being configured to divide the received extended signal by the known combined signal; perform an inverse Discrete Fourier Transform (DFT) on the result of the division to determine a channel impulse response; and identify a delay of an earliest non-aliased peak in the channel impulse response to determine the estimated TOA. In some embodiments, the WD is configured to receive the known combined signal from the network node.

According to yet another aspect, a method implemented in a wireless device (WD) configured to communicate with a network node, includes receiving, e.g. via radio interface, an extended signal that includes a base signal and at least one additional signal, and estimating a time of arrival (TOA) based on the extended signal.

According to this aspect, in some embodiments, a configuration of the at least one additional signal depends on a configuration of the base signal. In some embodiments, receiving the extended signal via the radio interface includes receiving the extended signal from a positioning node. In some embodiments, the base signal is a tracking reference signal (TRS). In some embodiments, the at least one additional signal is configured in the same at least one slot as the base signal with at least one different symbol position. In some embodiments, the estimating of the TOA includes adding, e.g. via the processing circuitry, in the time domain, symbols of the base signal and symbols of the at least one additional signal. In some embodiments, the estimating of the TOA further includes at least one of: correlating, e.g. via the processing circuitry, the received extended signal with a known combined signal and identifying the delay of the earliest non-aliased peak in the correlation to determine the estimated TOA; and dividing the received extended signal by the known combined signal; performing, e.g. via the processing circuitry, an inverse Discrete Fourier Transform (DFT) on the result of the division to determine a channel impulse response; and identifying, e.g. via the processing circuitry, a delay of an earliest non-aliased peak in the channel impulse response to determine the estimated TOA. In some embodiments, the known combined signal is received from the network node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 10 is a flowchart illustrating exemplary methods implemented in a communication system including a host computer, a network node and a wireless device for executing a client application at a wireless device according to some embodiments of the present disclosure;

FIG. 11 is a flowchart illustrating exemplary methods implemented in a communication system including a host computer, a network node and a wireless device for receiving user data at a wireless device according to some embodiments of the present disclosure;

FIG. 12 is a flowchart illustrating exemplary methods implemented in a communication system including a host computer, a network node and a wireless device for receiving user data from the wireless device at a host computer according to some embodiments of the present disclosure;

FIG. 13 is a flowchart illustrating exemplary methods implemented in a communication system including a host computer, a network node and a wireless device for receiving user data at a host computer according to some embodiments of the present disclosure;

DETAILED DESCRIPTION

The disclosure relates to extending an NR reference signal (herein referred to as the base signal), which does not utilize all subcarriers, with an additional signal, or at least one additional signal, which together with the base signal utilizes more subcarriers than the base signal alone. The extended reference signal includes the base signal and the at least one additional signal. The at least one additional signal may be offset in frequency by a subcarrier offset of at least one subcarrier relative to the base signal. The at least one subcarrier offset may be a subcarrier comb offset.

The disclosure provides for the wireless device to utilize the combination of a base signal and an additional signal for TOA estimation in such a way that the range of the TOA estimate is increased. The base signal may be a TRS, CSI-RS or PRS. The additional signal may be a TRS, CSI-RS or PRS. Thus, an extended reference signal includes the base signal and at least one additional signal.

The range of the TOA estimate here means the range of TOA delays that can be estimated without aliasing. The TOA estimation may be performed by correlating a received extended signal, e.g. a received extended reference signal, with a known combined signal. The terms "known combined signal", "known combined transmitted signal", "known transmitted combined signal", "known transmitted signal" and "known long combined transmitted signal" are used interchangeably herein to denote a signal transmitted by a network node and known by the wireless device.

Below a couple of non-limiting examples are generally described.

Example 1

Figure 1:
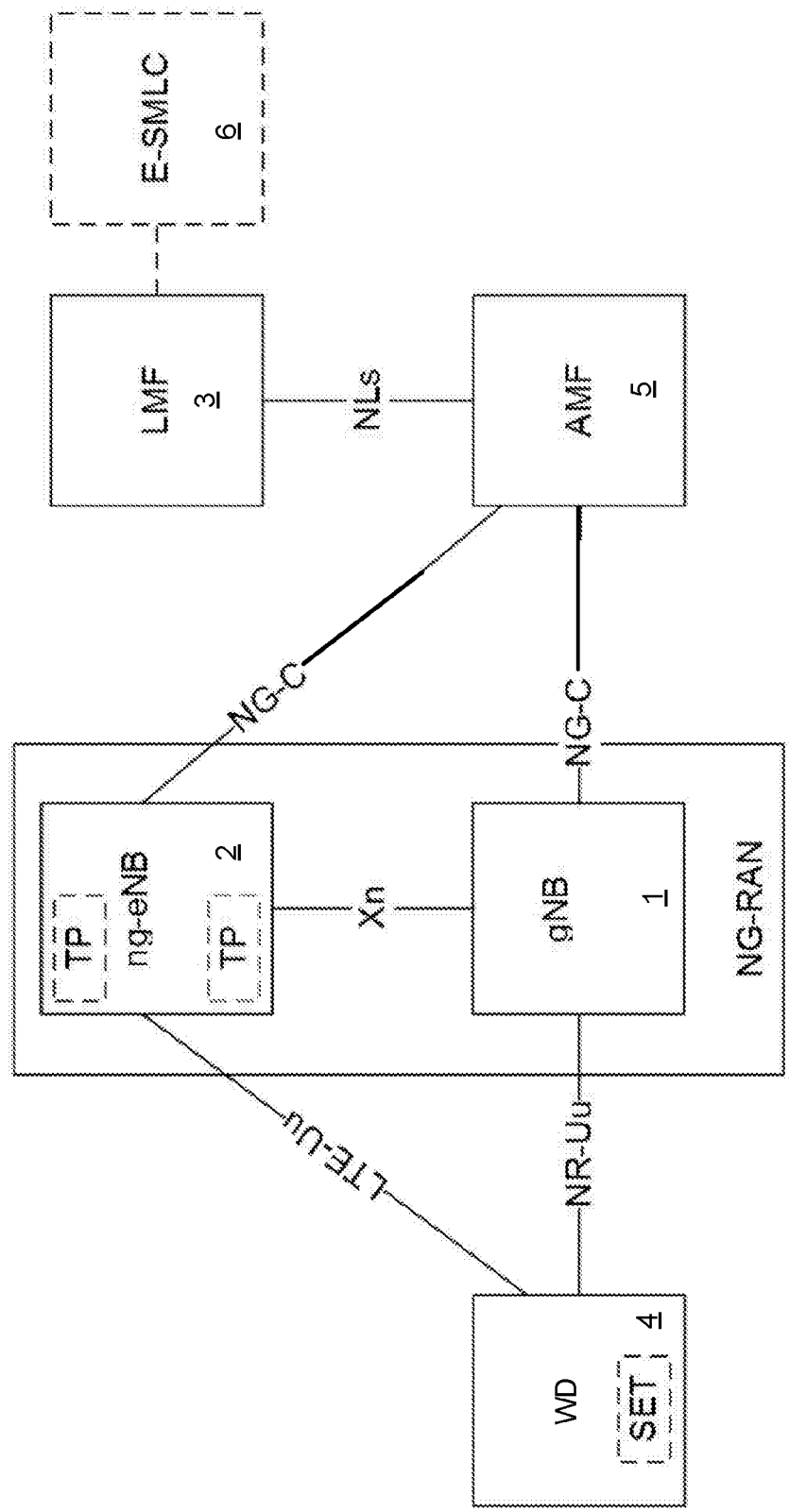
FIG. 1 is a diagram of NG-RAN 3GPP Release 15 architecture.
Figure 2:
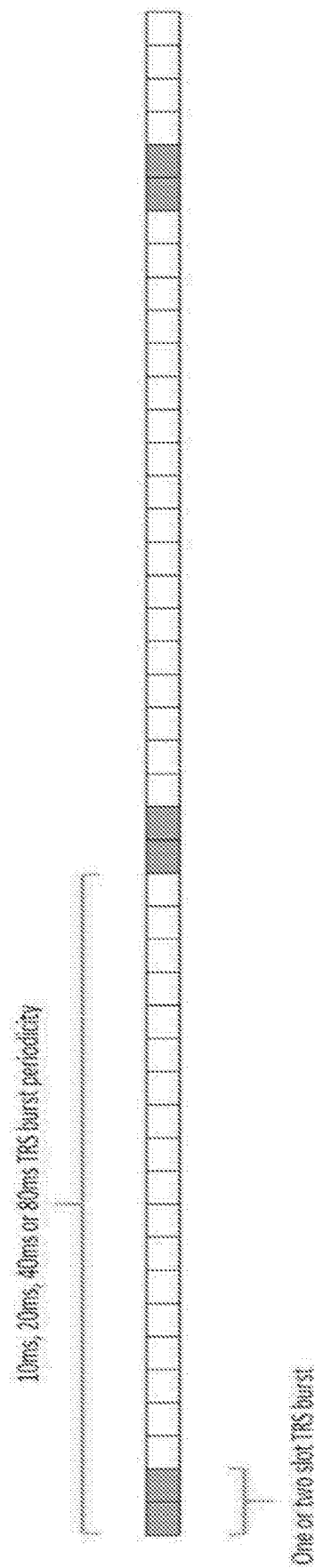
FIG. 2 is a diagram of TRS design in the time domain.
Figure 3:
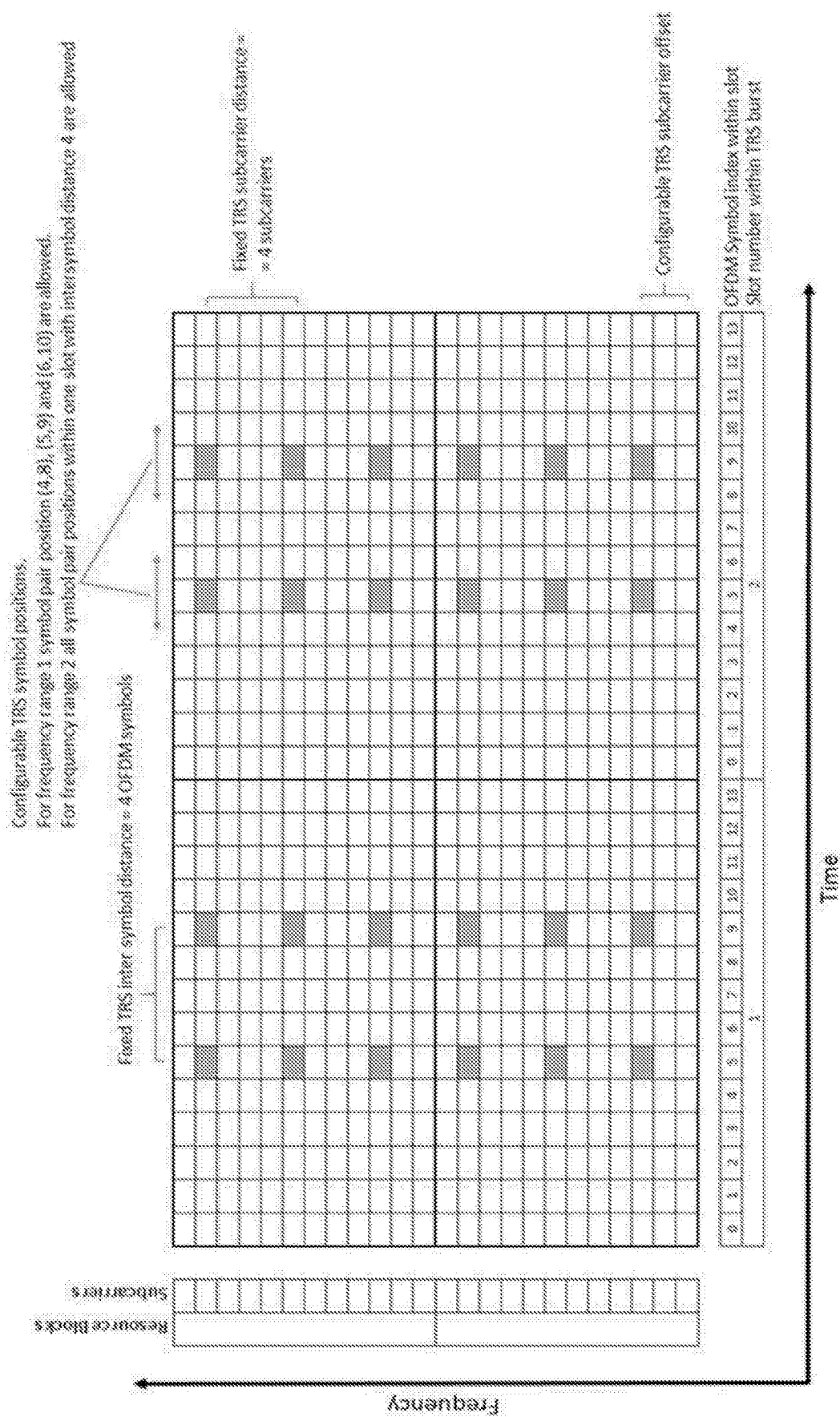
FIG. 3 is a diagram of TRS design in the frequency/time domain.
Figure 4:
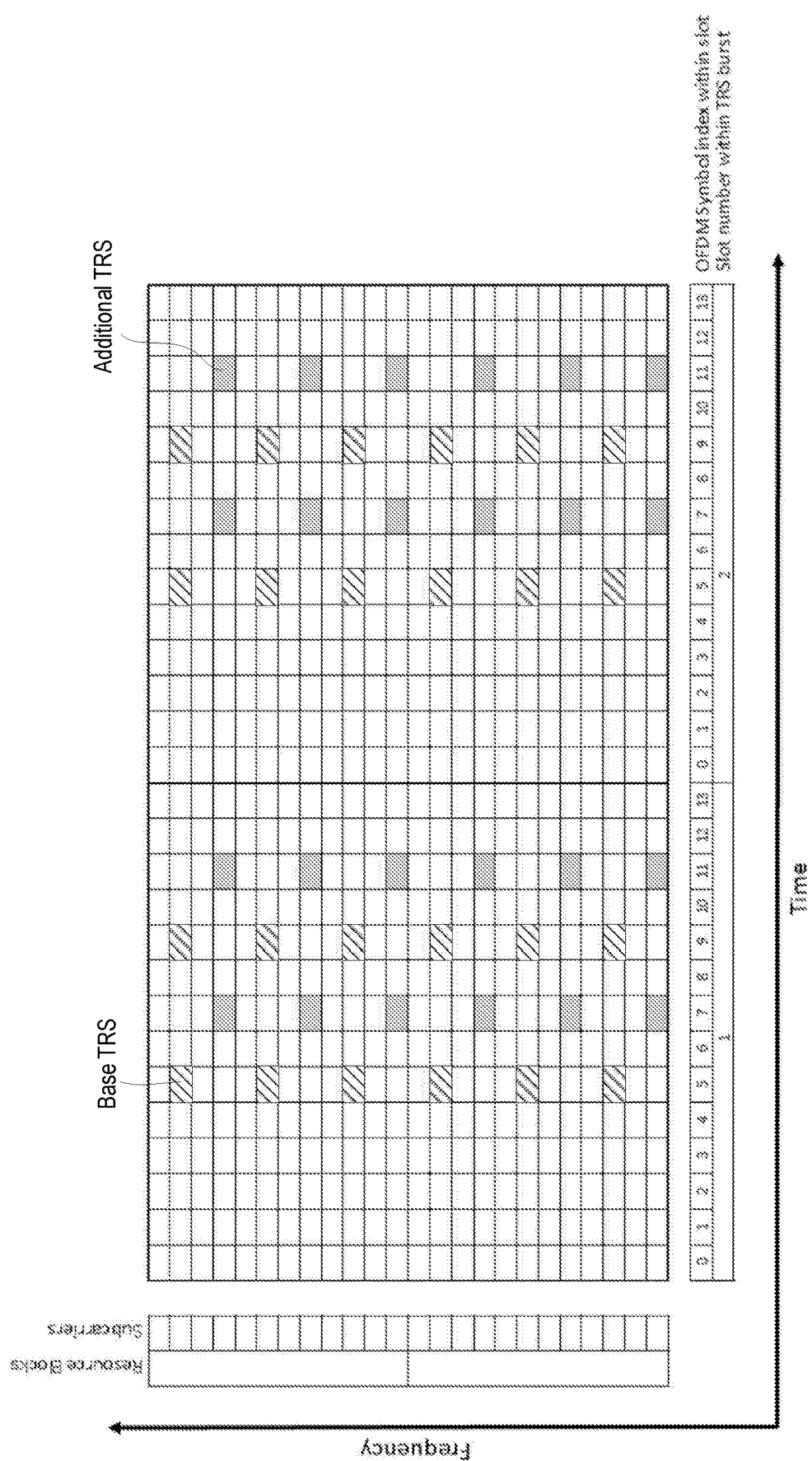
FIG. 4 is a diagram of base TRS extended with additional TRS according to the principles of the disclosure.

The base TRS is extended with an additional TRS in the same slot or slots with a different symbol position and a subcarrier offset, the subcarrier offset being a frequency shift of two subcarriers relative to the base TRS, as illustrated in FIG. 4, i.e.:

subcarrier_offset_additional_TRS=modulo(subcarrier_offset_TRS+2,4).

The extended TRS may then be transmitted by the network node.

In this example, the wireless device receives the extended TRS and adds the symbols of the base TRS and the symbols of the extension, e.g. the additional TRS, to get a combined signal which is effectively a comb-2 signal and utilizes this combined signal to perform a TOA estimate. The base TRS (denoted by hatchings in FIG. 4) is extended with an additional TRS (denoted by solid color in FIG. 4) in the same/slot(s) with a different symbol position and a subcarrier offset that is shifted two subcarriers relative to the base TRS.

Example 2

Figure 5:
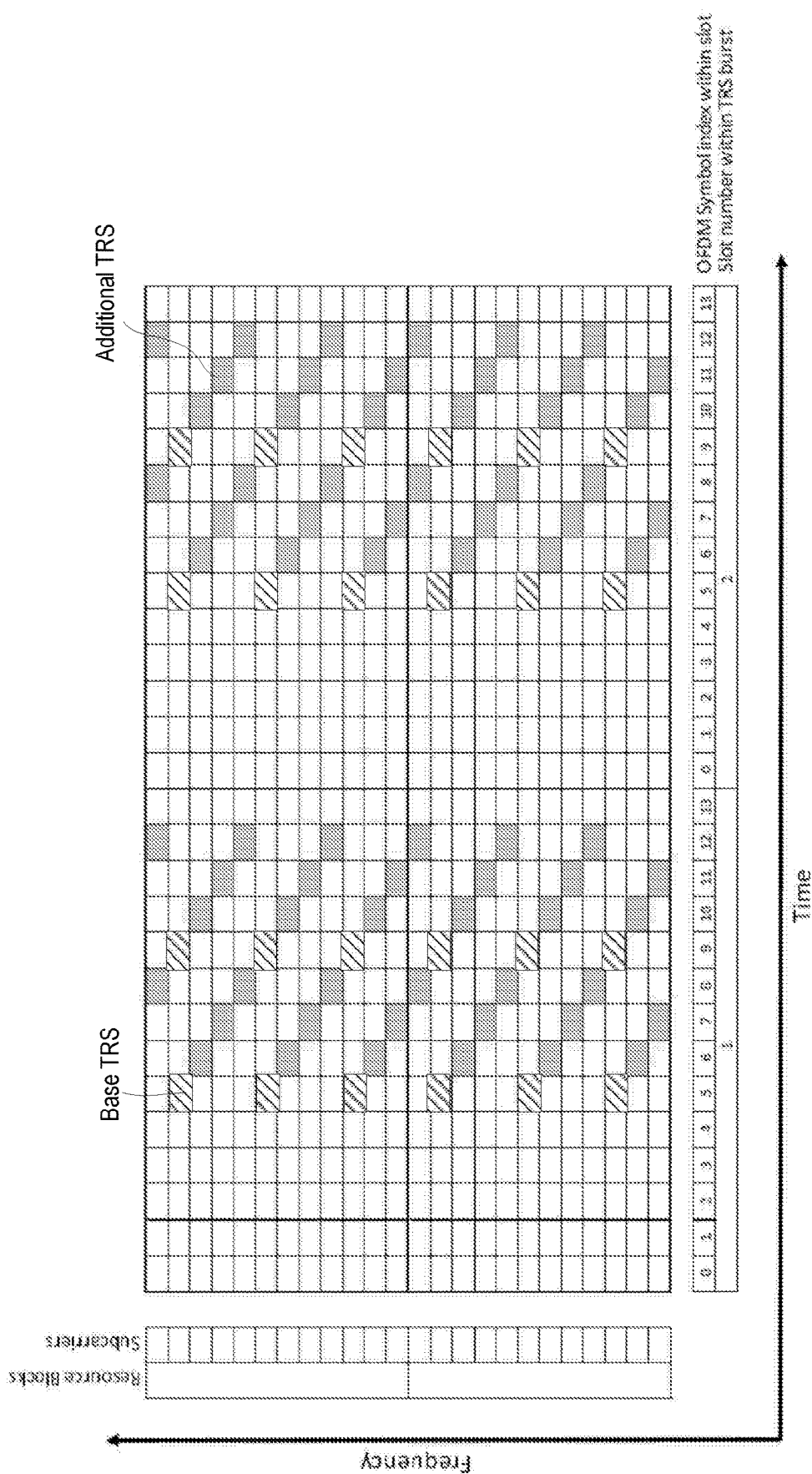
FIG. 5 is a diagram of base TRS extended with three additional TRSs according to the principles of the disclosure.

The base TRS is extended with three additional TRSs in the same slot/slots with different symbol positions and a subcarrier offset that is shifted one, two or three subcarriers relative to the base TRS, as illustrated in FIG. 5, i.e.

subcarrier_offset_additional_TRS_$i$=modulo(subcarrier_offset_TRS+1+modulo($i$,3),4),$i$=1,2, . . . ,6

The extended TRS may then be transmitted by the network node. In one or more embodiments, the additional TRS is a copied and shifted version of the base TRS. In FIG. 5, the base TRS (denoted by hatching) is extended with three additional TRSs (denoted by solid color) in the same slot/slots with different symbol positions and subcarrier offsets that are shifted one, two or three subcarriers relative to the base TRS.

In this example, the wireless device receives the extended TRS and adds the symbols of the base TRS and the symbols of the extension, e.g. the additional TRS, to get a combined signal which is effectively a comb-1 signal, i.e., a signal utilizing all available subcarriers. The wireless device utilizes this combined signal to make a TOA estimate.

Figure 6:
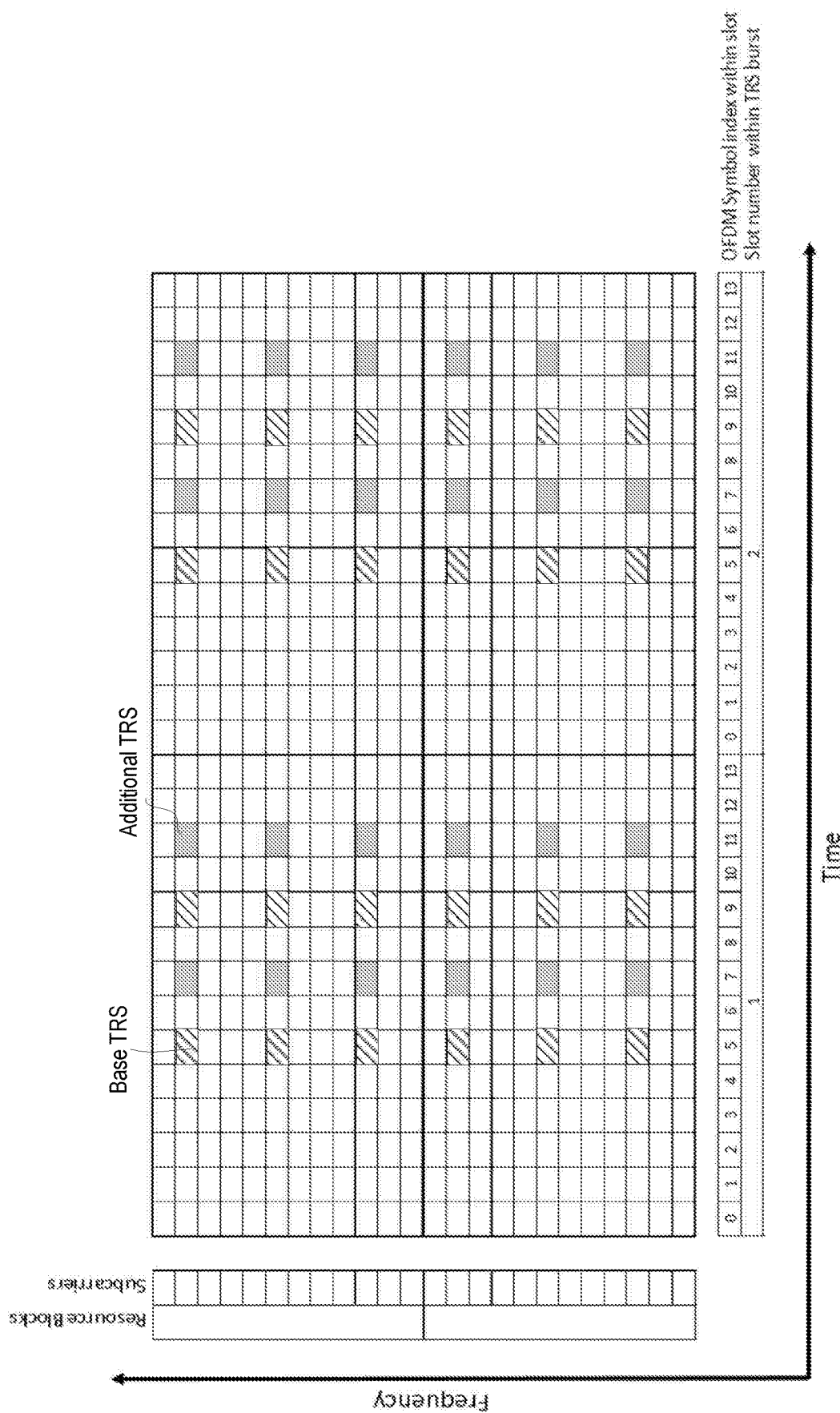
FIG. 6 is a diagram of TRS extension using additional TRS.

In a proposed scheme, different extensions of the TRS are described that can improve positioning accuracy. Examples are provided where the extension is an additional TRS with a different symbol position but with the same subcarrier offset as the base TRS. An example of such an extended TRS is illustrated in FIG. 6. In FIG. 6, a TRS extension uses an additional TRS (denoted by solid color in FIG. 6) with the same subcarrier offset but a different symbol position as the base TRS (denoted by hatchings in FIG. 6).

Figure 7:
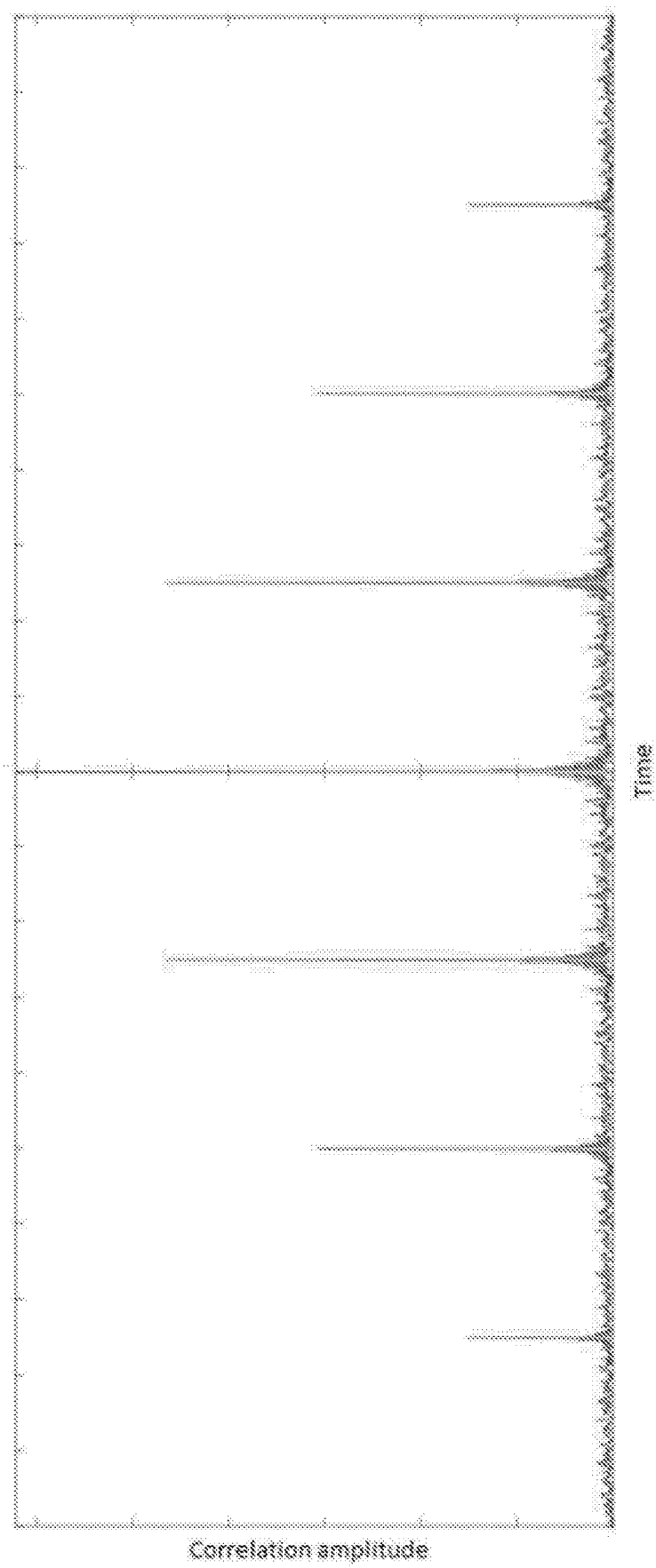
FIG. 7 is a diagram of absolute value of a correlation of a transmitted comb-4 signal with the signal received over an AWGN channel.

However, both the base TRS and the TRS extensions of the type illustrated in FIG. 6, where the TRS extension consists of one or more additional TRSs with a different symbol position but with the same subcarrier offset as the base TRS, have side peaks in the auto correlation function that can generate errors in the time of arrival measurement. The wireless device receiving the TRS, which includes the base signal and at least one additional signal, may correlate the received signal with the known transmitted signal. The known transmitted signal may be sent to the wireless device by the network node. If the channel consists of one single path and correspondingly one single delay, the correlation may consist of the autocorrelation plus noise as illustrated in FIG. 7. The time of arrival may be based at least in part on the time of the largest peak. The wireless device may, however, look for the earliest peak since for a multipath channel the earliest peak may correspond to the line of sight path which may be used for the positioning estimate. The wireless device may thus mis-detect one of the side peaks as the line of sight tap, i.e., peak.

This problem may be overcome by limiting the peak search within a time interval with the same length as the distance between the main peak and the first side peak in the autocorrelation function. This may however, limit the range of the TOA estimation. The distance between the peaks for the base TRS and the TRS extension of the type illustrated in FIG. 6 is T_range=T_OFDM/N=1/(N·subcarrierspacing) where N=4 is the comb factor of the base TRS and of the extended TRS. The range may limit how far away transmission points can be to allow time of arrival measurements. The range in distance is given by d_range=T_range·c=c/(N·subcarrierspacing), where c is the speed of light. This may limit the inter site distance of the scenarios for which positioning may work. Numerical values for the range distance are set forth in Table 1, below.

TABLE 1 the range distance for comb signals at different subcarrier spacing (SCS)

| SCS [kHz] | Comb: | | | | |
|---|---|---|---|---|---|
| | 1 Range [m] | 2 Range [m] | 4 Range [m] | 6 Range [m] | 12 Range [m] |
| 15 | 20000 | 10000 | 5000 | 3333 | 1667 |
| 30 | 10000 | 5000 | 2500 | 1667 | 833 |
| 60 | 5000 | 2500 | 1250 | 833 | 417 |
| 120 | 2500 | 1250 | 625 | 417 | 208 |
| 240 | 1250 | 625 | 313 | 208 | 104 |

An explanation is provided below as to why a comb signal has side peaks in the autocorrelation function. An orthogonal frequency division multiplexed (OFDM) symbol in time, t, can be written as a Fourier expansion of the subcarrier symbols $c_k$ as $$h(t)=\Sigma_{k=0}^{N-1} c_k e^{j \cdot 2\pi \cdot k \cdot \Delta f \cdot t} \text{ for } 0 \leq t < T$$

where T is the OFDM symbol time and $$\Delta f = \frac{1}{T}$$

is the subcarrier spacing.

Note that the periodicity of the Fourier expansion basis functions $e^{j \cdot 2\pi \cdot k \cdot \Delta f \cdot t}$ is $$\frac{1}{k \cdot \Delta f} = \frac{T}{k}$$

except for the constant basis function (k=0). For a comb-n signal with zero subcarrier offset, $c_k \neq 0$ only for k=n*m for some integer m. Then all basis functions for which $c_k \neq 0$ are periodic with period $$\frac{T}{n},$$

and thus n(t), is periodic with period $$\frac{T}{n}.$$

This can also be seen from the fact that the Fourier expansion can be reinterpreted as a Fourier expansion with subcarrier spacing n·Δf and OFDM symbol length $$\frac{T}{n}$$

(removing the terms that are zero, anyway).

For a comb-n signal with subcarrier offset s, then $c_k \neq 0$ only for $k=s+n*m$ for some integer m. By extracting a factor $e^{j \cdot 2\pi \cdot k \cdot \Delta f \cdot t}$ from the Fourier expansion it can be seen that $$h(t) = e^{j \cdot 2\pi \cdot k \cdot \Delta f \cdot t} \cdot g(t)$$

where g(t) is periodic with period $$\frac{T}{n}$$

When correlating with a signal that is periodic with a fraction $$\frac{T}{n}$$

of the OFDM symbol length T, there will obviously be additional correlation peaks for time offsets $$m \cdot \frac{T}{n}$$

relative to the main peak with m=1, 2, . . . , n−1. These additional correlation 'side' peaks are sometimes (quite confusingly) referred to as sidelobes. These peaks may be suppressed relative to the main peak, but not by much. The suppression of the mth additional peak compared to the main peak is roughly a factor $$\frac{n-m}{n}.$$

For a general comb-n signal h(t), is as follows:

$$h(t) = e^{j \cdot 2\pi \cdot k \cdot \Delta f \cdot t} \cdot g(t) \text{ where } g(t) \text{ is periodic with period}$$

$$\frac{T}{n}$$

The autocorrelation can then be written as $$c(\tau) = \int_0^T h(t) \cdot h^*(t-\tau) dt = e^{j \cdot 2\pi \cdot s \cdot \Delta f \cdot \tau} \int_0^T g(t) \cdot g^*(t-\tau) dt$$

where "*" denotes the complex conjugate.

Since the phase factor $e^{j \cdot 2\pi \cdot s \cdot \Delta f \cdot \tau}$ doesn't impact the magnitude of the autocorrelation, the general comb signal will also have additional peaks for time offsets $$m \cdot \frac{T}{n}$$

relative to the main peak of the same size as for a periodic function. Taking the cyclic prefix (CP) into account, the additional correlation peaks will be somewhat suppressed depending on whether the CP length is much shorter than the OFDM symbol length.

Some embodiments may solve one or more issues with existing systems, thereby allowing for the range of the TOA estimation to be increased. This means that the TOA can be estimated for signals coming from more distant transmission points. Another advantage that may be provided by embodiments described herein is that, since more signal energy is received in a given TRS transmission occasion, e.g. one or two slots long, the resulting Signal to Interference plus Noise Ratio (SINR) is improved, resulting in a better TOA accuracy for a given received TRS occasion.

Before describing in detail exemplary embodiments, it is noted that the embodiments reside primarily in combinations of apparatus components and processing steps related to an extended signal such as an extended tracking reference signal (TRS) for time of arrival (TOA) estimation. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible for achieving the electrical and data communication.

In some embodiments described herein, the term "coupled", "connected", and the like, may be used to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), gNode B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU), Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipment (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU), Remote Radio Head (RRH).

The term resource used herein may correspond to any type of physical resource or radio resource expressed in terms of length of time and/or frequency. Signals are transmitted or received by a radio node over a time resource. Examples of time resources are: symbol, time slot, subframe, radio frame, Transmission Time Interval (TTI), interleaving time, etc.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

Transmitting in the downlink may pertain to transmission from the network or network node to the terminal. Transmitting in uplink may pertain to transmission from the terminal to the network or network node. Transmitting in the side link may pertain to (direct) transmission from one terminal to another. Uplink, downlink and side link (e.g., side link transmission and reception) may be considered communication directions. In some variants, uplink and downlink may also be used to describe wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of side link or uplink communication or similar thereto.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources, and/or for estimating TOA. Uplink resources and/or downlink resources may be scheduled and/or provided with allocation or configuration data.

Signaling may comprise one or more signals and/or symbols. Reference signaling may comprise one or more reference signals and/or symbols. Signaling may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation, Wireless Local Area Network (WLAN), Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for an extended signal such as an extended tracking reference signal (TRS) for time of arrival (TOA) estimation.

Figure 8:
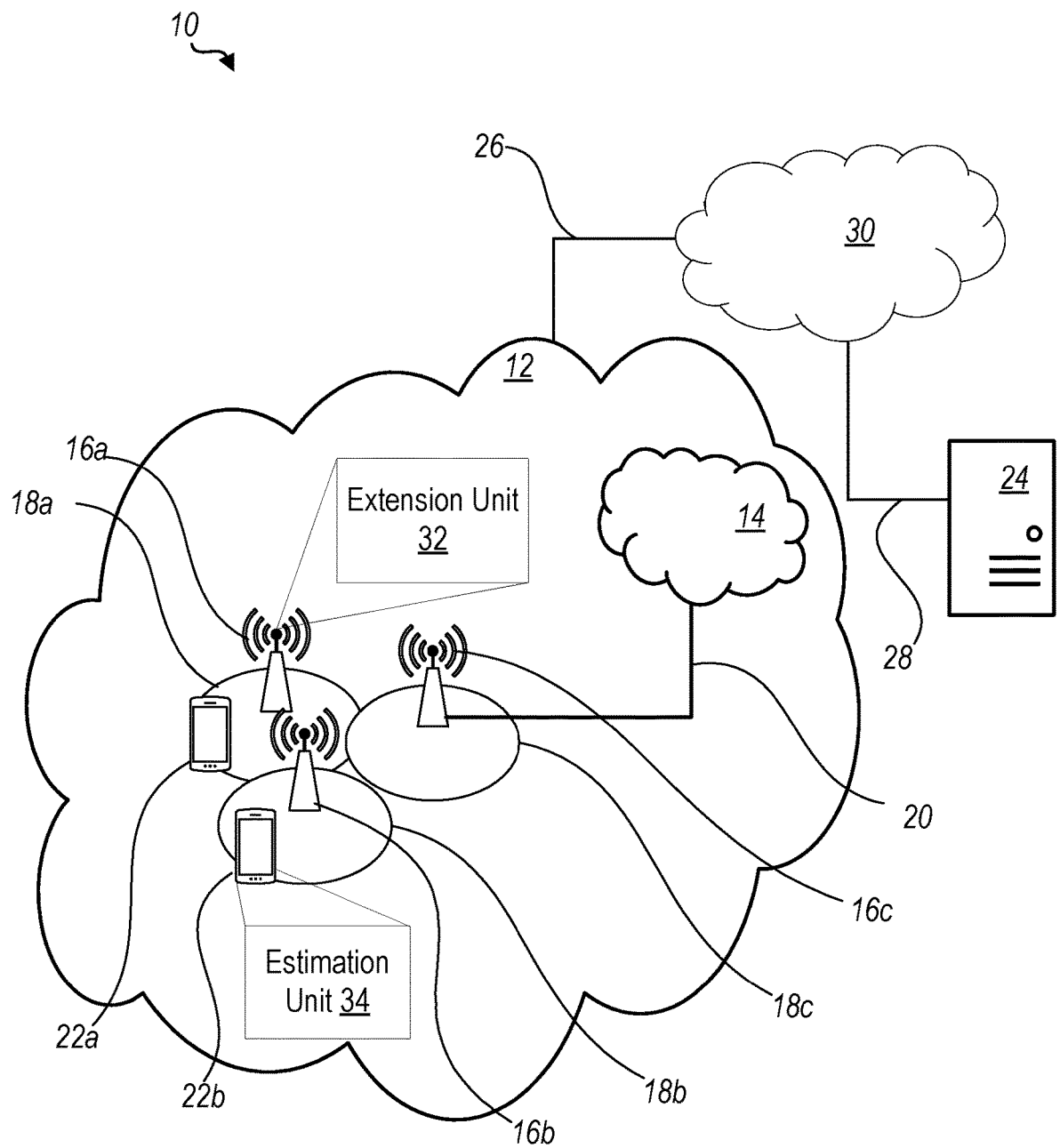
FIG. 8 is a schematic diagram of an exemplary network architecture illustrating a communication system connected via an intermediate network to a host computer according to the principles in the present disclosure.

Returning now to the drawing figures, in which like elements are referred to by like reference numerals, there is shown in FIG. 8 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 8 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an extension unit 32 which is configured to provide an extended signal such as an extended tracking reference signal (TRS) for time of arrival (TOA) estimation. A wireless device 22 is configured to include an estimation unit 34 which is configured to estimate TOA based at least in part on the extended signal.

Example implementations, in accordance with an embodiment, of the WD 22, network node 16 and host computer 24 discussed in the preceding paragraphs will now be described with reference to FIG. 9. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to provide, receive, transmit, determine, store, forward, relay, etc., information related to the extended signal and/or TOA estimation described herein.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include extension unit 32.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an estimation unit 34.

Figure 9:
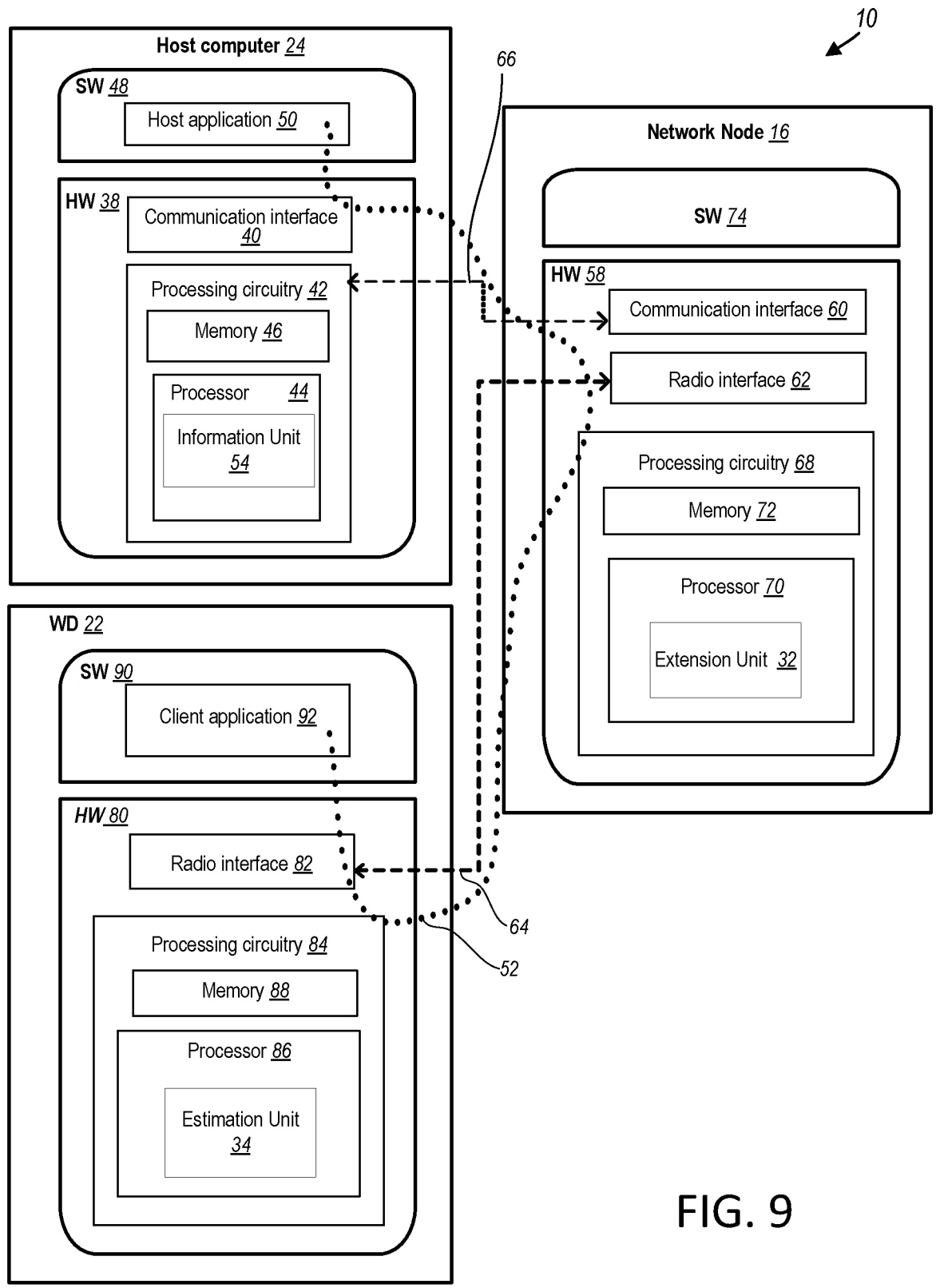
FIG. 9 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 9 and independently, the surrounding network topology may be that of FIG. 8.

In FIG. 9, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting receipt of a transmission from the WD 22.

In some embodiments, the host computer 24 includes processing circuitry 42 and a communication interface 40 that is configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting receipt of a transmission from the network node 16.

Although FIGS. 8 and 9 show various "units" such as extension unit 32, and estimation unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 10 is a flowchart illustrating an exemplary method implemented in a communication system, such as, for example, the communication system of FIGS. 8 and 9, in accordance with one embodiment. The communication system may include a host computer 24, a network node 16 and a WD 22, which may be those described with reference to FIG. 9. In a first step of the method, the host computer 24 provides user data (Block S100). In an optional sub step of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 11 is a flowchart illustrating an exemplary method implemented in a communication system, such as, for example, the communication system of FIG. 8, in accordance with one embodiment. The communication system may include a host computer 24, a network node 16 and a WD 22, which may be those described with reference to FIGS. 8 and 9. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 12 is a flowchart illustrating an exemplary method implemented in a communication system, such as, for example, the communication system of FIG. 8, in accordance with one embodiment. The communication system may include a host computer 24, a network node 16 and a WD 22, which may be those described with reference to FIGS. 8 and 9. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 13 is a flowchart illustrating an exemplary method implemented in a communication system, such as, for example, the communication system of FIG. 8, in accordance with one embodiment. The communication system may include a host computer 24, a network node 16 and a WD 22, which may be those described with reference to FIGS. 8 and 9. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 14:
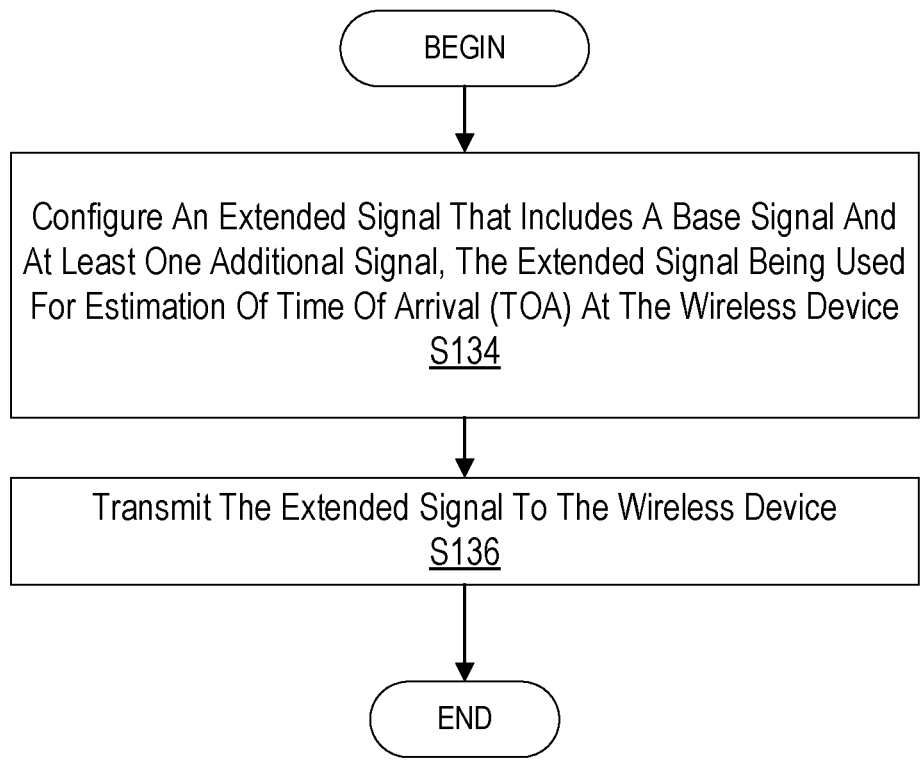
FIG. 14 is a flowchart of an exemplary process in a network node according to some embodiments of the present disclosure.

FIG. 14 is a flowchart of an exemplary process in a network node 16 according to some embodiments of the disclosure. One or more blocks and/or functions performed by network node 16 may be performed by one or more elements of network node 16 such as by extension unit 32 in processing circuitry 68, processor 70, radio interface 62, etc. In one or more embodiments, network node 16 such as via one or more of processing circuitry 68, processor 70 and radio interface 62 is configured to configure (Block S134) an extended signal that includes a base signal and at least one additional signal where the extended signal is used for estimation of time of arrival (TOA) at the wireless device 22. In one or more embodiments, network node 16 such as via one or more of processing circuitry 68, processor 70 and radio interface 62 is configured to transmit (Block S136) the extended signal to the WD 22.

According to one or more embodiments, the base signal is a tracking reference signal (TRS) and the at least one additional signal is at least one additional TRS in the same at least one slot with at least one different symbol position. According to one or more embodiments, the at least one additional signal has a subcarrier offset, the subcarrier offset being a frequency shift of a number of subcarriers relative to the base signal. In other words, at least one additional signal is, in these embodiments, offset in frequency by a subcarrier offset of at least one subcarrier relative to the base signal. The subcarrier offset may be a subcarrier comb offset.

Figure 15:
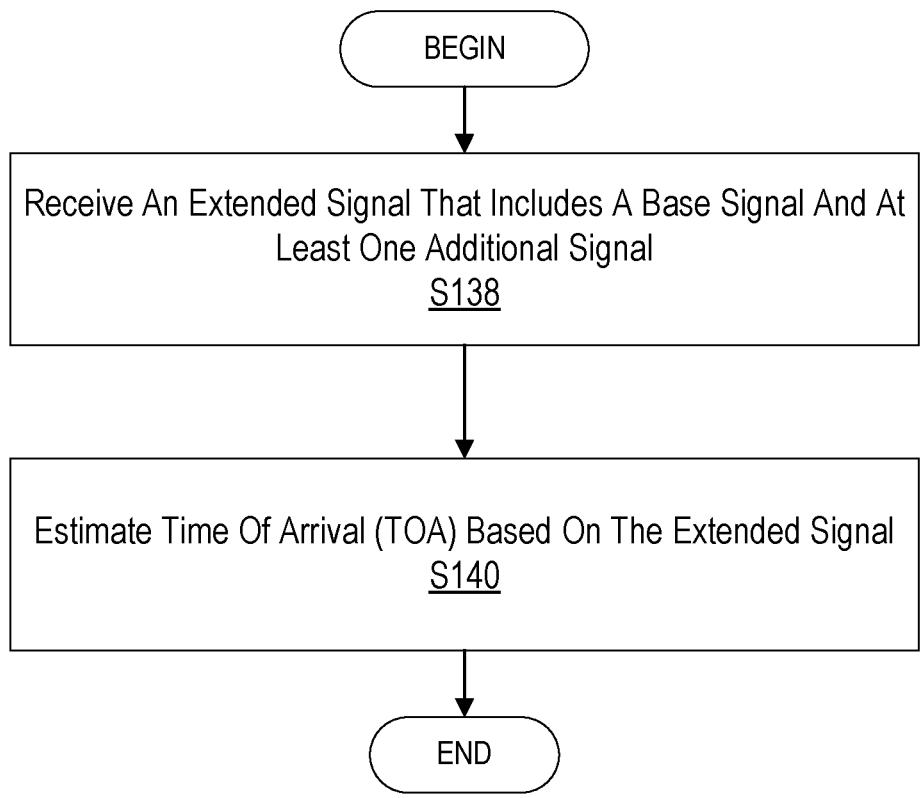
FIG. 15 is a flowchart of an exemplary process in a wireless device according to some embodiments of the present disclosure.

FIG. 15 is a flowchart of an exemplary process in a wireless device 22 according to some embodiments of the present disclosure. One or more blocks and/or functions performed by wireless device 22 may be performed by one or more elements of wireless device 22 such as by estimation unit 34 in processing circuitry 84, processor 86, radio interface 82, etc. In one or more embodiments, wireless device 22 such as via one or more of processing circuitry 84, processor 86 and radio interface 82 is configured to receive an extended signal that includes a base signal an at least one additional signal (Block S138). The process further includes estimating a time of arrival (TOA) based on the extended signal (Block S140).

According to one or more embodiments, the base signal is a tracking reference signal (TRS) and the at least one additional signal is at least one additional TRS in the same at least one slot with at least one different symbol position. According to some embodiments, the estimating of the TOA includes adding, in the time domain, symbols of the base signal and symbols of the at least one additional signal, resulting is a set of added symbols representing the received extended signal. According to some embodiments, the estimating of the TOA further includes at least one of: correlating the received extended signal with a known transmitted combined signal and identifying a delay of an earliest non-aliased peak in the correlation; dividing the received extended signal by the known transmitted combined signal, e.g. symbol-wise in the frequency domain; performing an inverse Discrete Fourier Transform (DFT) on the result of the division to determine a channel impulse response; and identifying a delay of an earliest non-aliased peak in the channel impulse response.

Having generally described arrangements for an extended signal such as an extended TRS for TOA estimation, details for these arrangements, functions and processes are provided as follows, and which may be implemented by the network node 16, wireless device 22 and/or host computer 24.

Embodiments may generally be related to an extended signal such as an extended TRS for TOA estimation, Some embodiments extend an NR reference signal (herein referred to as the base signal), which does not utilize all subcarriers, with an additional signal which together with the base signal utilizes more subcarriers than the base signal alone.

In some embodiments, the wireless device 22 or network node 16 utilizes the combination of the base signal and the additional signal for TOA estimation in such a way that the range of the TOA estimate is increased.

The range of the TOA estimate here corresponds to the range of TOA delays that can be estimated without aliasing, in some embodiments.

Some embodiments configure existing NR reference signals and NR data transmissions to allow for accurate TOA measurements with a large range for positioning, and to configure wireless devices to perform such measurements.

Some embodiments supplement existing NR reference signals with additional signals that can be used by the wireless device in combination with the existing NR reference signals to achieve TOA measurements for positioning that have a larger range and/or is more accurate, and to configure wireless devices 22 to perform such measurements.

Example 1

In this example, the base TRS is extended with an additional TRS in the same slot/slots with a different symbol position and a subcarrier offset that is shifted two subcarriers relative to the base TRS. The extended signal is therefore a combination of the base TRS and the additional TRS as illustrated in FIG. 16, i.e., subcarrier_offset_additional_TRS=modulo(subcarrier_offset_TRS+2,4).

Figure 16:
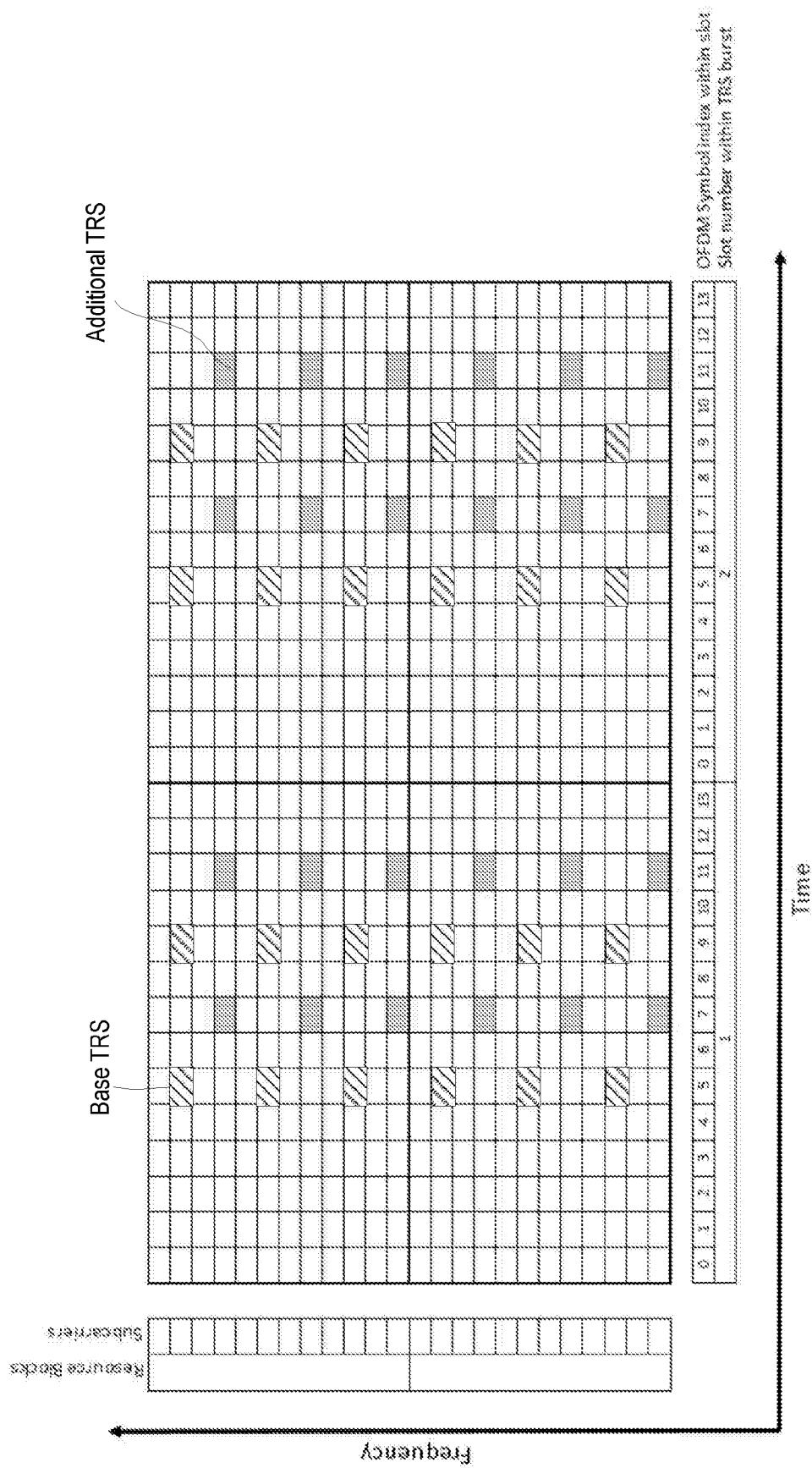
FIG. 16 is a diagram of base TRS extended with additional TRS according to the principles of the disclosure.

Note that the figures such as FIG. 16 do not limit the symbol positions of the base TRS and the extension, e.g. the additional TRS. The additional TRS pattern can be shifted forward or backward in time relative to the base TRS and the shift can be different numbers of symbols. In FIG. 16, the base TRS (denoted by hatches in FIG. 16) is extended with additional TRSs (denoted by solid color in FIG. 16) in the same slot/slots with a different symbol position and a subcarrier offset that is shifted two subcarriers relative to the base TRS.

The extended TRS may be transmitted by the network node 16 via for example radio interface 62.

The wireless device 22 receives, for example via radio interface 82, the extended TRS and utilizes it to estimate the TOA over an extended range as compared to a TOA estimation based only on the base TRS.

In one or more embodiments, the wireless device 22 handles via for example processing circuitry 84, the combined signal as one long signal in time and correlates the long combined received signal with the known long combined transmitted signal. In some embodiments, the device next identifies the delay of the earliest non-aliased peak in the correlation (rising sufficiently above the noise) as the TOA estimate. In some embodiments, the device next identifies/selects, via for example processing circuitry 84, the delay of the mid peak, which can be performed by the wireless device 22 for example when the wireless device 22 uses other synchronization information from the basic time synchronization data.

In one or more embodiments, the device processing via for example processing circuitry 84 may be performed as described in Example 1b, below.

Example 1b Wireless Device 22 Processing

In some embodiments, the wireless device 22 adds, via for example processing circuitry 84, the symbols of the base TRS and the symbols of the extension (e.g., additional TRS) to get a combined signal which is effectively a comb-2 signal. The addition may be performed in the time domain by addition, sample by sample. Let $$b(i,n), i=1,2,\ldots 4, n=1,2,\ldots, N$$

be the N received samples for base TRS symbol i, and let $$a(i,n), i=1,2,\ldots 4, n=1,2,\ldots, N$$

be the N received samples for the additional TRS symbol i. The combined symbol is then calculated by the wireless device 22 as:

$$c(n)=\Sigma_{i=1}^{4}(b(i,n)+a(i,n)), n=1,2,\ldots,N$$

The transmitted combined signal is similarly defined as:

$$c_{tx}(n)=\Sigma_{i=1}^{4}(b_{tx}(i,n)+a_{tx}(i,n)), n=1,2,\ldots,N$$

where $b_{tx}(i,n)$ and $a_{tx}(i,n)$ are, respectively, the transmitted base TRS and the transmitted additional TRS. Next, the wireless device 22 estimates, via for example processing circuitry 84, the TOA based on c(n).

In some embodiments, the estimation of the TOA is performed by correlating the received combined signal c (n) with the known transmitted combined signal $c_{tx}(n)$ and identifying the delay of the earliest non-aliased peak in the correlation (rising sufficiently above the noise) as the TOA estimate.

In some embodiments, this may be done by dividing the received combined signal c(n) with the known transmitted combined signal $c_{tx}(n)$, or by multiplying the received combined signal c(n) with the complex conjugate of the known transmitted combined signal $c_{tx}(n)$, and performing an inverse DFT (e.g., with an inverse fast Fourier transform (IFFT)) to get the channel impulse response. Next the wireless device 22 identifies, for example via/using processing circuitry 84, the delay of the earliest non-aliased peak in the channel impulse response (rising sufficiently above the noise) as the TOA estimate, in some embodiments.

Example 2

Figure 17:
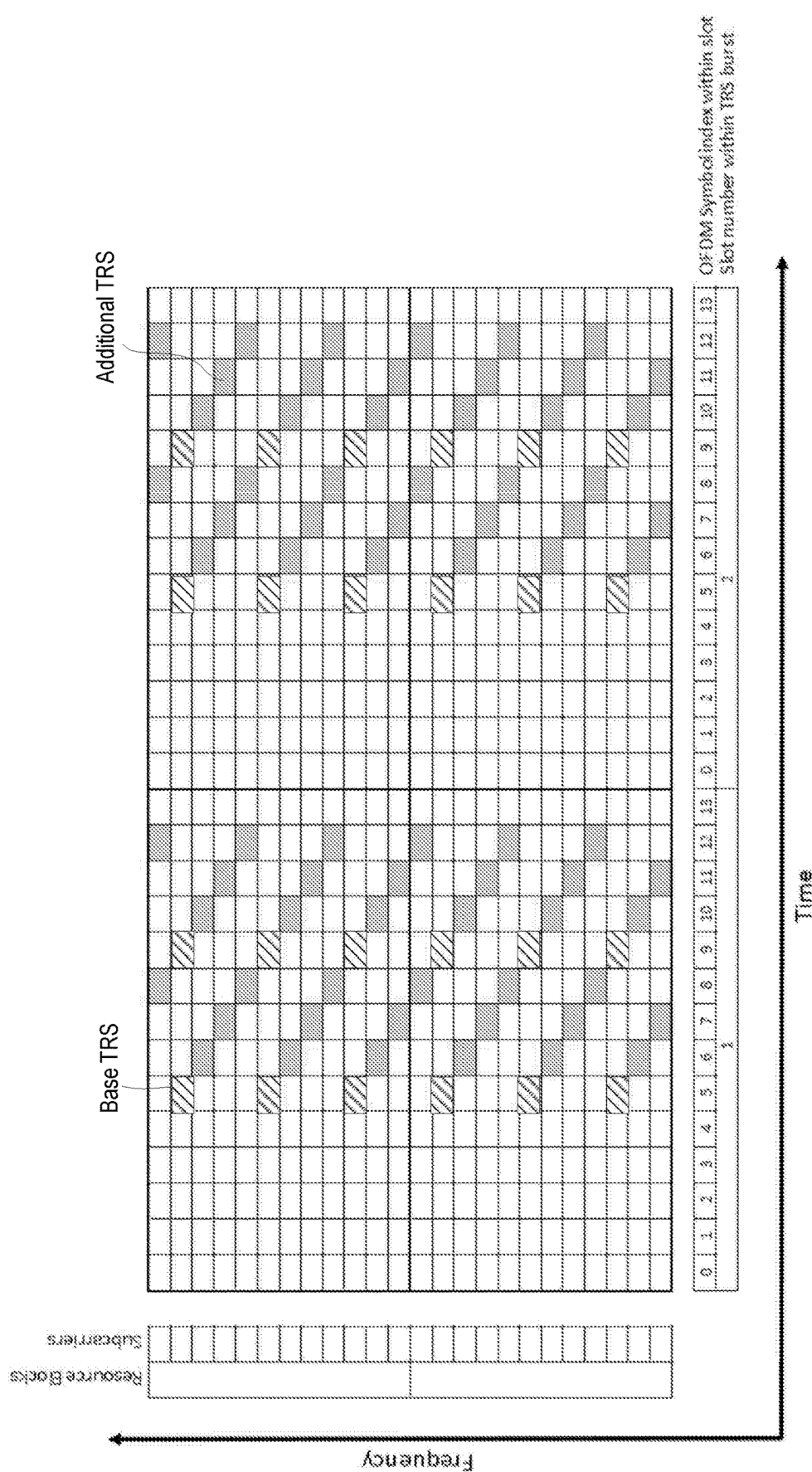
FIG. 17 is a diagram of base TRS extended with additional TRSs according to the principles of the disclosure.

In this example, the base TRS is extended with three additional TRSs in the same slot/slots with different symbol positions and a subcarrier offset that is shifted one, two or three subcarriers relative to the base TRS, as illustrated in FIG. 17, i.e., $$\text{subcarrier\_offset\_additional\_TRS}\_i=\text{modulo}(\text{subcarrier\_offset\_TRS}+1+\text{modulo}(i,3),4), i=1,2,\ldots,6.$$

FIG. 17 is a non-limiting example of the symbol positions of the base TRS and the extension, e.g. the additional TRSs. The additional TRS pattern can be shifted forward or backward in time relative to the base TRS and the shift can be different numbers of symbols. In FIG. 17 the base TRS (w/hatchings) is extended with three additional TRSs (denoted by solid color) in the same slot/slots with different symbol positions and subcarrier offsets that are shifted one, two or three subcarriers relative to the base TRS. Note that in this example, a one slot TRS burst includes a pair of symbols. Three additional one slot TRSs thus corresponds to six additional symbols. Similarly, a two slot TRS burst includes two pairs of symbols and three additional two slot TRSs thus corresponds to twelve (two times six) additional symbols. The extended TRS may be transmitted by the network node 16, for example via radio interface 62. The wireless device 22 may then receive the extended TRS and utilize it to estimate the TOA over an extended range as compared to a TOA estimation based only on the base TRS.

In one or more embodiments, the wireless device 22 handles (i.e., processes), via for example, processing circuitry 84, the combined signal as one long signal in time and correlates the long combined received signal with the known long combined transmitted signal. In some embodiments, the wireless device 22 next identifies, via or using processing circuitry 84, the delay of the earliest non-aliased peak in the correlation (rising sufficiently above the noise) as the TOA estimate. In some embodiments, the wireless device 22 identifies/selects, for example via processing circuitry 84, the delay of the mid peak, which can be performed by the wireless device 22, when the wireless device 22 uses other synchronization information from the basic time synchronization data.

In some embodiments, the wireless device processing is performed as in Example 2b.

Example 2b Wireless Device Processing

In this example, the wireless device 22 adds, such as via processing circuitry 84, the symbols of the base TRS and the symbols of the extension (e.g., additional TRS) to get a combined signal which is effectively a comb-1 signal, i.e., a signal utilizing all available subcarriers. The addition is performed in the time domain by addition sample by sample. Let $$b(i,n), i=1,2,\ldots 4, n=1,2,\ldots, N$$

be the N received samples for base TRS symbol i, and let $$a(i,n), i=1,2,\ldots 6, n=1,2,\ldots, N$$

be the N received samples for the additional TRS symbol i. The combined symbol is then calculated by the wireless device 22 as $$c(n)=\Sigma_{i=1}^{4}b(i,n)+\Sigma_{i=1}^{6}a(i,n), n=1,2,\ldots,N$$

The transmitted combined signal is similarly defined as $$c_{tx}(n)=\Sigma_{i=1}^{4}(i,n)+\Sigma_{i=1}^{6}a_{tx}(i,n), n=1,2,\ldots,N$$

where $b_{tx}(i,n)$ and $a_{tx}(i,n)$ are respectively the transmitted base TRS and the transmitted additional TRS. Next the wireless device 22 estimates the TOA based on c(n).

In some embodiments, the TOA is estimated by correlating the received combined signal c(n) with the known transmitted combined signal $c_{tx}(n)$ and identifying the delay of the earliest non-aliased peak in the correlation (rising sufficiently above the noise) as the TOA estimate.

In some embodiments, the TOA is estimated by dividing the received combined signal c(n) with the known transmitted combined signal $c_{tx}(n)$, or by multiplying the received combined signal c(n) with the complex conjugate of the known transmitted combined signal $c_{tx}(n)$, and computing an inverse DFT (e.g., with an IFFT) to get the channel impulse response. Next the wireless device 22 identifies, via (i.e., using) for example, processing circuitry 84, the delay of the earliest non-aliased peak in the channel impulse response (rising sufficiently above the noise) as the TOA estimate. In some embodiments, the known transmitted combined signal may be based on one or more previously received signals and/or explicitly indicated to the wireless device, for example, by the network node 16.

Signaling Aspects

The signaling of the configuration and the associated report can be constructed in different ways, as described below.

In some embodiments, the different configurable base TRSs are defined and preconfigured and each configuration is associated with an index, such as, for example, trs_base_ind. The base TRS can also be associated with different possible extensions, each also associated with an index, such as, for example, trs_ext_ind. From FIGS. 16 and 17, the following extensions can be defined:

| trs_ext_ind | Definition |
| --- | --- |
| trs_1_forward | One TRS extension as exemplified by FIG. 16, with extension TRS 2 resource elements (REs) forward, shifted 2 REs in frequency |
| trs_1_backward | One TRS extension as exemplified by FIG. 16, but with extension TRS 2 REs backward, shifted 2 REs in frequency |
| trs_3_forwarddown | Three TRS extension as exemplified by FIG. 17, with each extension TRS 1 REs forward, shifted 1 REs down in frequency |
| trs_3_forwardup | Three TRS extension as exemplified by FIG. 17, but with each extension TRS 1 REs forward, shifted 1 REs up in frequency |
| trs_3_backwarddown | Three TRS extension as exemplified by FIG. 17, but with each extension TRS 1 REs backward, shifted 1 REs down in frequency |
| trs_3_backwardup | Three TRS extension as exemplified by FIG. 17, but with each extension TRS 1 REs backward, shifted 1 REs up in frequency |

In some embodiments, the different configurable TRSs are defined and preconfigured and each configuration is associated with an index, for example, trs_base_ind. A TRS configuration provided to the wireless device 22 may include a group index, where a TRS associated to the same group index can be assumed to be sent from the same transmission point (TP), e.g., network node 16, and can therefore be combined by the wireless device 22.

In some embodiments, the wireless device 22 can group, using processing circuitry 84, the TRS configurations, in case each TRS is associated with information about a TP position, where TPs associated with the same position can be assumed to be from the same antenna.

In some embodiments, the positioning information report includes radio condition measurements associated with TRSs, which correspond to base and extension TRSs. In such embodiments, the device associates the radio condition measurements (TOA) with a base TRS (or TRX) index, e.g., trs_base_ind.

In one or more embodiments, where the TRSs are provided to the wireless device 22 with a group index, the radio condition measurements (TOA) are associated with the corresponding group index in the report.

In some embodiments, the TRS configuration signaling and measurement reporting is via a protocol such as LTE positing protocol (LPP) between the location server (e.g., network node 16) and the wireless device 22.

In some embodiments, the TRS configuration signaling and measurement reporting is via a protocol between a network node 16 and the wireless device 22 such as by RRC.

Figure 18:
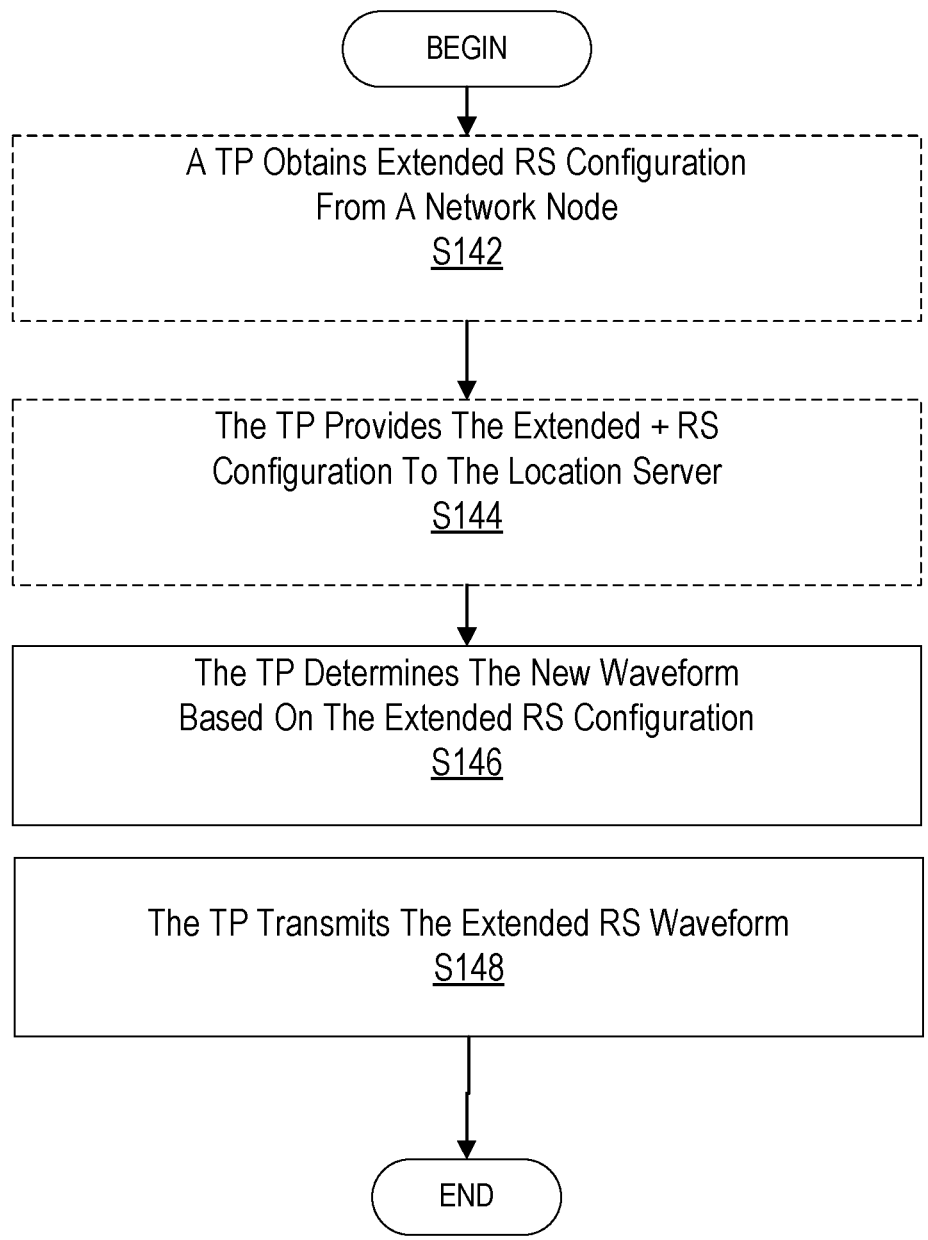
FIG. 18 is a flowchart of an exemplary process in transmission point according to some embodiments of the present disclosure.

FIG. 18 is a flowchart of a process for a transmission point in accordance with some embodiments described herein. In some embodiments, a transmission point (TP) obtains (Block S142) an extended reference signal (RS) (e.g., TRS) configuration from a network node 16. The TP provides (Block S144) the extended RS configuration to the location server. The TP also determines (Block S146) a new waveform based on the extended RS configuration, and transmits (Block S148) the extended RS waveform (i.e. the determined new waveform).

In some embodiments, the process generally includes, optionally, the transmission point receiving a configuration from the operation, administration and maintenance (OAM) system, or other network node 16. The configuration is, in some embodiments, an extended reference signal (RS) configuration, as described herein. The transmission point (TP) may also optionally send the extended reference signal configuration to a network node 16 such as the location server. The transmission point determines the associated reference signal waveform based on the received extension configuration and transmits the extended reference signal.

Figure 19:
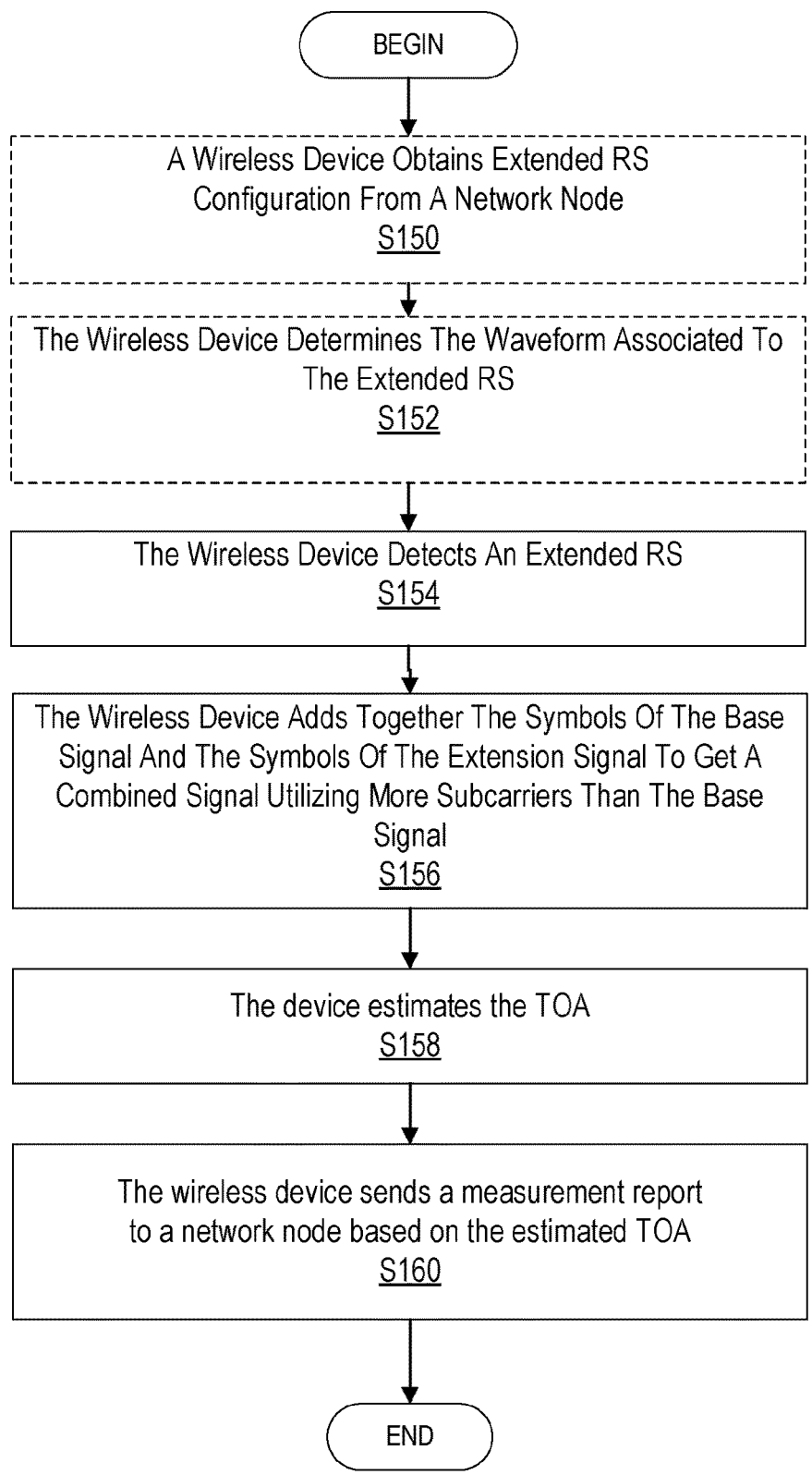
FIG. 19 is. is a flowchart of an exemplary process in a wireless device according to some embodiments of the present disclosure.

FIG. 19 is a flowchart of a process for a wireless device 22 in accordance with principles of the present disclosure. In some embodiments, the wireless device 22 is configured, via, for example, processing circuitry 84 and/or radio interface 82, to obtain an extended RS configuration from a network node 16 (Block S150). The process also includes determining the waveform associated to the extended RS (Block S152). The process also includes detecting an extended RS (Block S154). The process further includes adding the symbols of the base signal and the symbols of the additional signals to get a combined signal utilizing more subcarriers than the base signal (Block S156). The process also includes estimating (Block S158) TOA, and sending (Block S160) a measurement report to the network node 16 based on the estimated TOA.

Therefore, some embodiments generally provide for extending the available TRS in such a manner as to remove or reduce the amplitude of the side peaks in the autocorrelation of the combined signal (or in the channel impulse response calculated based on the combined signal) in order to extend the range of the TOA estimate and to improve the TOA estimation accuracy due to improved SINR in a received TRS occasion.

According to one aspect, a network node 16 is configured to communicate with a wireless device (WD) 22. The network node 16 includes processing circuitry 68 configured to configure an extended signal that includes a base signal and at least one additional signal, the extended signal being used for estimation of time of arrival (TOA) at the wireless device. The network node 16 also includes a radio interface 62 configured to transmit the extended signal to the WD 22.

According to this aspect, in some embodiments, a configuration of the at least one additional signal depends on a configuration of the base signal. In some embodiments, the network node being configured to communicate with a wireless device further comprises at least one of: the network node being configured to transmit the extended signal via a radio interface and the network node being configured to signal the configuration of the extended signal to one of the wireless device and another network node. In some embodiments, the base signal is a tracking reference signal (TRS). In some embodiments, the at least one additional signal is configured in the same at least one slot as the base signal with at least one different symbol position as compared to symbol positions of the base signal. In some embodiments, the at least one additional signal has a subcarrier offset relative to the base signal of at least one subcarrier. In some embodiments, the extended signal utilizes all available subcarriers. In some embodiments, the base signal is a channel state information reference signal (CSI-RS), which is a type TRS. In some embodiments, the network node is configured to assign the at least one additional signal, e.g. via the processing circuitry 68, to a resource element that is shifted in frequency from a resource element to which the base signal is assigned. In some embodiments, the network node is configured to assign the at least one additional signal, e.g. via the processing circuitry 68, to a resource element that is shifted in time from a resource element to which the base signal is assigned. In some embodiments, the network node is configured to transmit a known combined signal to the WD 22 for comparison to the extended signal.

According to another aspect, a method implemented in a network node 16 configured to communicate with a wireless device 22 is provided. The method includes configuring at block S134, e.g. via processing circuitry 68, an extended signal that includes a base signal and at least one additional signal, the extended signal being used for estimation of time of arrival (TOA) at the wireless device. The method also includes transmitting at block S136, e.g. via the radio interface 62, the extended signal to the WD 22.

According to this aspect, in some embodiments, a configuration of the at least one additional signal depends on a configuration of the base signal. In some embodiments, the network node being configured to communicate with a wireless device further comprises at least one of: the network node transmitting the extended signal via a radio interface and the network node signaling the configuration of the extended signal to one of the wireless device and another network node. In some embodiments, the base signal is a tracking reference signal (TRS). In some embodiments, the at least one additional signal is configured in the same at least one slot as the base signal with at least one different symbol position as compared to symbol positions of the base signal. In some embodiments, the at least one additional signal has a subcarrier offset relative to the base signal of at least one subcarrier. In some embodiments, the extended signal utilizes all available subcarriers. In some embodiments, the base signal is a channel state information reference signal (CSI-RS). In some embodiments, the at least one additional signal is assigned, e.g. via the processing circuitry 68, to a resource element that is shifted in frequency from a resource element to which the base signal is assigned. In some embodiments, the at least one additional signal is assigned, e.g. via the processing circuitry 68, to a resource element that is shifted in time from a resource element to which the base signal is assigned. In some embodiments, the method includes transmitting a known combined signal to the WD 22 for comparison to the extended signal.

According to another aspect, a WD 22 is configured to communicate with a network node 16. The WD 22 includes a radio interface 82, configured to receive an extended signal that includes a base signal and at least one additional signal, and processing circuitry 84 configured to estimate a time of arrival (TOA) based on the extended signal.

According to this aspect, in some embodiments, a configuration of the at least one additional signal depends on the configuration of the base signal. In some embodiments, receiving the extended signal via the radio interface 82 includes receiving the extended signal from a positioning node. In some embodiments, the base signal is a tracking reference signal (TRS). In some embodiments, the at least one additional signal is configured in the same at least one slot as the base signal with at least one different symbol position as compared to symbol positions of the base signal. In some embodiments, the processing circuitry 84 being configured to estimate the TOA includes the processing circuitry 84 being configured to add, in the time domain, symbols of the base signal and symbols of the at least one additional signal. In some embodiments, the processing circuitry 84 being configured to estimate the TOA further includes at least one of: the processing circuitry 84 being configured to correlate a received extended signal with a known combined signal and identify the delay of the earliest non-aliased peak in the correlation to determine the estimated TOA; and the processing circuitry 84 being configured to divide the received extended signal by the known combined signal; perform an inverse Discrete Fourier Transform (DFT) on the result of the division to determine a channel impulse response; and identify a delay of an earliest non-aliased peak in the channel impulse response to determine the estimated TOA. In some embodiments, the WD 22 is configured to receive the known combined signal from the network node 16.

According to yet another aspect, a method implemented in a wireless device (WD) 22 configured to communicate with a network node 16, includes receiving at block S138, e.g. via radio interface 82, an extended signal that includes a base signal and at least one additional signal, and estimating at block S140 a time of arrival (TOA) based on the extended signal.

According to this aspect, in some embodiments, a configuration of the at least one additional signal depends on the configuration of the base signal. In some embodiments, receiving the extended signal via the radio interface 82 includes receiving the extended signal from a positioning node. In some embodiments, the base signal is a tracking reference signal (TRS). In some embodiments, the at least one additional signal is configured in the same at least one slot as the base signal with at least one different symbol position as compared to symbol positions of the base signal. In some embodiments, the estimating of the TOA includes adding, e.g. via the processing circuitry 84, in the time domain, symbols of the base signal and symbols of the at least one additional signal. In some embodiments, the estimating of the TOA further includes at least one of: correlating, e.g. via the processing circuitry 84, the received extended signal with a known combined signal and identifying the delay of the earliest non-aliased peak in the correlation to determine the estimated TOA; and dividing, e.g. via the processing circuitry 84, the received extended signal by the known combined signal; performing, via the processing circuitry 84, an inverse Discrete Fourier Transform (DFT) on the result of the division to determine a channel impulse response; and identifying, e.g. via the processing circuitry 84, a delay of an earliest non-aliased peak in the channel impulse response to determine the estimated TOA. In some embodiments, the known combined signal is received from the network node 16.

Some examples include the following.

Example A1. A network node configured to communicate with a wireless device (WD), the network node configured to, and/or comprising a radio interface and/or comprising processing circuitry configured to:

configure an extended signal that is based at least in part on a base signal and at least one additional signal, the extended signal being used for estimation of time of arrival (TOA) at the wireless device; and optionally transmit the extended signal.

Example A2. The network node of Example A1, wherein the base signal is a tracking reference signal (TRS) and the at least one additional signal is at least one additional TRS in the same at least one slot with at least one different symbol position.

Example A3. The network node of Example A1, wherein the at least one additional signal has a subcarrier offset relative to the base signal.

Example B1. A method implemented in a network node configured to communicate with a wireless device, the method comprising configuring an extended signal that is based at least in part on a base signal and at least one additional signal, the extended signal being used for estimation of time of arrival (TOA) at the wireless device; and optionally transmitting the extended signal.

Example B2. The method of Example B1, wherein the base signal is a tracking reference signal (TRS) and the at least one additional signal is at least one additional TRS in the same at least one slot with at least one different symbol position.

Example B3. The method of Example B1, wherein the at least one additional signal has a subcarrier offset relative to the base signal.

Example C1. A wireless device (WD) configured to communicate with a network node, the WD configured to, and/or comprising a radio interface and/or comprising processing circuitry configured to estimate time of arrival (TOA) based on an extended signal that is based at least in part on a base signal and at least one additional signal.

Example C2. The WD of Example C1, wherein the base signal is a tracking reference signal (TRS) and the at least one additional signal is at least one additional TRS in the same at least one slot with at least one different symbol position.

Example C3. The WD of Example C1, wherein the estimating of the TOA includes adding, in the time domain, together symbols of the base signal and symbols of the at least one additional signal.

Example C4. The WD of Example C3, wherein the estimating of the TOA further includes at least one of:

correlating the added symbols with a known transmitted combined signal and identifying a delay of an earliest non-aliased peak in the correlation; and dividing the added symbols by a known transmitted combined signal, performing an inverse Discrete Fourier Transform (DFT) on the result of the division to determine a channel impulse response and identifying a delay of an earliest non-aliased peak in the correlation.

Example D1. A method implemented in a wireless device (WD), the method comprising estimating time of arrival (TOA) based on an extended signal that is based at least in part on a base signal and at least one additional signal.

Example D2. The method of Example D1, wherein the base signal is a tracking reference signal (TRS) and the at least one additional signal is at least one additional TRS in the same at least one slot with at least one different symbol position.

Example D3. The method of Example D1, wherein the estimating of the TOA includes adding, in the time domain, together symbols of the base signal and symbols of the at least one additional signal.

Example D4. The method of Example D1, wherein the estimating of the TOA further includes at least one of:

correlating the added symbols with a known transmitted combined signal and identifying a delay of an earliest non-aliased peak in the correlation; and dividing the added symbols by a known transmitted combined signal, performing an inverse Discrete Fourier Transform (DFT) on the result of the division to determine a channel impulse response and identifying a delay of an earliest non-aliased peak in the correlation.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
LOS Line of Sight
NLOS Non-Line of Sight
NR New Radio
OTDOA Observed Time Difference of Arrival
PDP Power Delay Profile
TDOA Time Difference of Arrival
TRS Tracking Reference Signal It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a network node configured to communicate with a wireless device, WD, the method comprising:
    configuring an extended signal that includes a base signal and at least one additional signal, the extended signal being used for estimation of time of arrival, TOA, at the wireless device, the estimation of the TOA further including at least one of:
        correlating the received extended signal with a known combined signal and identify the delay of the earliest non-aliased peak in the correlation to determine the estimated TOA; and
        dividing the received extended signal by the known combined signal;
        performing an inverse Discrete Fourier Transform (DFT) on the result of the division to determine a channel impulse response; and
        identifying a delay of an earliest non-aliased peak in the channel impulse response to determine the estimated TOA; and
    transmitting the extended signal to the WD.

2. The method of claim 1, wherein the network node being configured to communicate with a wireless device further comprises at least one of: the network node transmitting the extended signal via a radio interface and the network node signaling the configuration of the extended signal to one of the wireless device and another network node.

3. The method of claim 1, further comprising transmitting a known combined signal to the WD for comparison to the extended signal.

4. A wireless device, WD, configured to communicate with a network node, the WD including:
    a radio interface configured to receive an extended signal that includes a base signal and at least one additional signal; and
    processing circuitry configured to estimate a time of arrival, TOA, based on the extended signal, the processing circuitry being configured to estimate the TOA further including at least one of:
        correlate the received extended signal with a known combined signal and identify the delay of the earliest non-aliased peak in the correlation to determine the estimated TOA; and
        divide the received extended signal by the known combined signal;
        perform an inverse Discrete Fourier Transform (DFT) on the result of the division to determine a channel impulse response; and
        identify a delay of an earliest non-aliased peak in the channel impulse response to determine the estimated TOA.

5. The WD of claim 4, wherein a configuration of the at least one additional signal depends on a configuration of the base signal.

6. The WD of claim 4, wherein receiving the extended signal via the radio interface includes receiving the extended signal from a positioning node.

7. The WD of claim 4, wherein the base signal is a tracking reference signal, TRS.

8. The WD of claim 4, wherein the at least one additional signal is configured in the same at least one slot as the base signal with at least one different symbol position.

9. The WD of claim 4, wherein the processing circuitry being configured to estimate the TOA includes the processing circuitry being configured to add, in the time domain, symbols of the base signal and symbols of the at least one additional signal.

10. The WD of claim 4, wherein the WD is configured to receive the known combined signal from the network node.

11. A method implemented in a wireless device WD configured to communicate with a network node, the method comprising:
  receiving an extended signal that includes a base signal and at least one additional signal; and
  estimating a time of arrival, TOA, based on the extended signal, the estimating the TOA further including at least one of:
    correlating the received extended signal with a known combined signal and identify the delay of the earliest non-aliased peak in the correlation to determine the estimated TOA; and
    dividing the received extended signal by the known combined signal;
    performing an inverse Discrete Fourier Transform (DFT) on the result of the division to determine a channel impulse response; and
    identifying a delay of an earliest non-aliased peak in the channel impulse response to determine the estimated TOA.

12. The method of claim 11, wherein a configuration of the at least one additional signal depends on a configuration of the base signal.

13. The method of claim 11, wherein receiving the extended signal via the radio interface includes receiving the extended signal from a positioning node.

14. The method of claim 11, wherein the base signal is a tracking reference signal, TRS.

15. The method of claim 11, wherein the at least one additional signal is configured in the same at least one slot as the base signal with at least one different symbol position.

16. The method of claim 11, wherein the estimating of the TOA includes adding, in the time domain, symbols of the base signal and symbols of the at least one additional signal.

17. The method of claim 11, wherein the known combined signal is received from the network node.

* * * * *